US012792459B2

(12) United States Patent
Li et al.

(10) Patent No.: US 12,792,459 B2
(45) Date of Patent: Nov. 10, 2026

(54) HANDLING READ FAILURE IN ZONE MEMORY SYSTEM

(71) Applicant: Micron Technology, Inc., Boise, ID (US)

(72) Inventors: Juane Li, Milpitas, CA (US); Amit Bhardwaj, Longmont, CO (US); Michael Winterfeld, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 18/788,474

(22) Filed: Jul. 30, 2024

(65) Prior Publication Data

US 2026/0037369 A1 Feb. 5, 2026

(51) Int. Cl.
*G06F 11/10* (2006.01)
*G06F 11/07* (2006.01)

(52) U.S. Cl.
CPC ...... *G06F 11/1016* (2013.01); *G06F 11/0772* (2013.01); *G06F 11/1068* (2013.01)

(58) Field of Classification Search
CPC . G06F 11/1016; G06F 11/077; G06F 11/1068
USPC .......................................................... 714/764
See application file for complete search history.

(56) References Cited

U.S. PATENT DOCUMENTS

| | | | | |
|---|---|---|---|---|
| 11,914,471 | B1 * | 2/2024 | Subbarao | G06F 11/0793 |
| 2017/0169034 | A1 * | 6/2017 | Shrivastava | G06F 16/283 |
| 2019/0332544 | A1 * | 10/2019 | Jia | G06F 12/1045 |
| 2022/0139466 | A1 | 5/2022 | Gorobets et al. | |
| 2022/0319622 | A1 | 10/2022 | Bhardwaj | |
| 2024/0061597 | A1 | 2/2024 | Lam et al. | |
| 2024/0143170 | A1 | 5/2024 | Lakshmi et al. | |
| 2024/0220359 | A1 | 7/2024 | Inbar et al. | |
| 2026/0037140 | A1 | 2/2026 | Li et al. | |
| 2026/0037399 | A1 | 2/2026 | Li et al. | |

FOREIGN PATENT DOCUMENTS

CN 101356510 A * 1/2009

* cited by examiner

*Primary Examiner* — Albert Decady
*Assistant Examiner* — Enam Ahmed
(74) *Attorney, Agent, or Firm* — Schwegman Lundberg & Woessner, P.A.

(57) ABSTRACT

Various embodiments provide handling block read failure in a memory sub-system that supports zones. In particular, some embodiments described herein handle block read failure during a data read (e.g., host data write) of a cache block or a non-cache block of a zone on a memory device on a memory sub-system, block read failure during refresh of a cache block or a non-cache block of a zone on a memory device on a memory sub-system, block read failure during migration of data between a cache block and a non-cache block of a zone on a memory device on a memory sub-system, or some combination thereof.

20 Claims, 16 Drawing Sheets

HANDLING READ FAILURE IN ZONE MEMORY SYSTEM

TECHNICAL FIELD

Embodiments of the disclosure relate generally to memory devices and, more specifically, to handling block read failure in a memory system or sub-system that supports zones.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
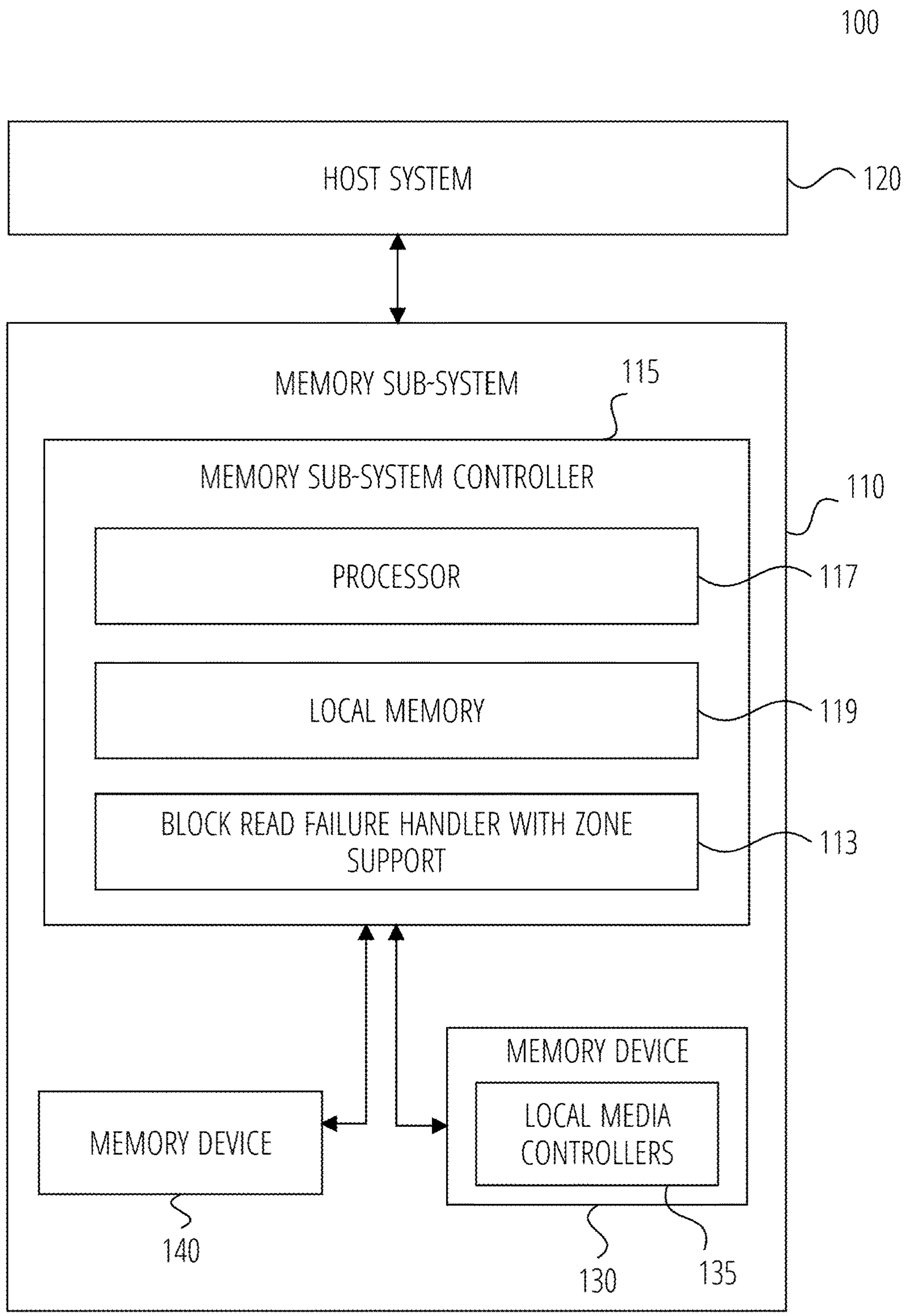
FIG. 1 is a block diagram illustrating an example computing system that includes a memory sub-system, in accordance with some embodiments of the present disclosure.

Aspects of the present disclosure are directed to handling block read failure in a memory sub-system that supports zones (hereafter, a zone memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

The data can be stored in the memory sub-system according to zones. Such a memory sub-system can be referred to as a zone-based memory sub-system or a zone memory sub-system. As used herein, a zone can comprise a contiguous range of logical addresses (e.g., logical block addresses) that is managed within a memory sub-system as a single unit. In comparison to block level data management, a zone-based memory sub-system can use zones to organize and manage data as larger, logically contiguous memory regions, which can allow for more efficient use of storage space on the memory sub-system and reduce write amplification of blocks. Each zone can be managed independently and have an associated state machine maintained by the memory sub-system. The state machine of an individual zone can comprise a set of states for the individual zone, where each state in the set of states (e.g., in combination with and a zone type of the individual zone) can define operational characteristics of the individual zone. Example zone states for an individual zone can include, without limitation: empty (e.g., ZSE:Empty); implicitly opened (e.g., ZSIO:Implicitly Opened); explicitly opened (e.g., ZSEO:Explicitly Opened); closed (e.g., ZSC:Closed); full (e.g., ZSF:Full); read only (e.g., ZSRO:Read Only); or offline (e.g., ZSO:Offline). Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks in a corresponding die or set of die rather than sequentially across a row of blocks, and a particular application can be associated with a given zone that spans a single die. User or host data associated with that application can be stored in that given zone on the single die. A zone can be defined in a memory sub-system in accordance with a NVM EXPRESS (NVMe) specification (e.g., Zone Namespaces (ZNS) specification from NVMe). For instance, a zone can be defined in a memory sub-system by one or more NVMe commands issued to the memory sub-system.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more dies. Each die can comprise one or more planes. For some types of non-volatile memory devices (e.g., AND-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application data.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a triple-layer cell (TLC) block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

Conventional zone memory sub-systems can use full SLC-block caching (also referred to as SLC caching), where data is buffered (e.g., written first) on SLC cache blocks and the buffered data is released from the SLC cache block after the buffered data is written to non-cache blocks (e.g., MLC, TLC, QLC blocks) and the written data is verified to be free of defects on the non-cache blocks. In some implementations where the non-cache blocks are QLC blocks, four SLC blocks could be utilized per an open QLC block. For instance, where a memory sub-system has sixteen open QLC blocks per NAND-device plane, sixty-four SLC cache blocks would be used per a plane.

Figure 2A:
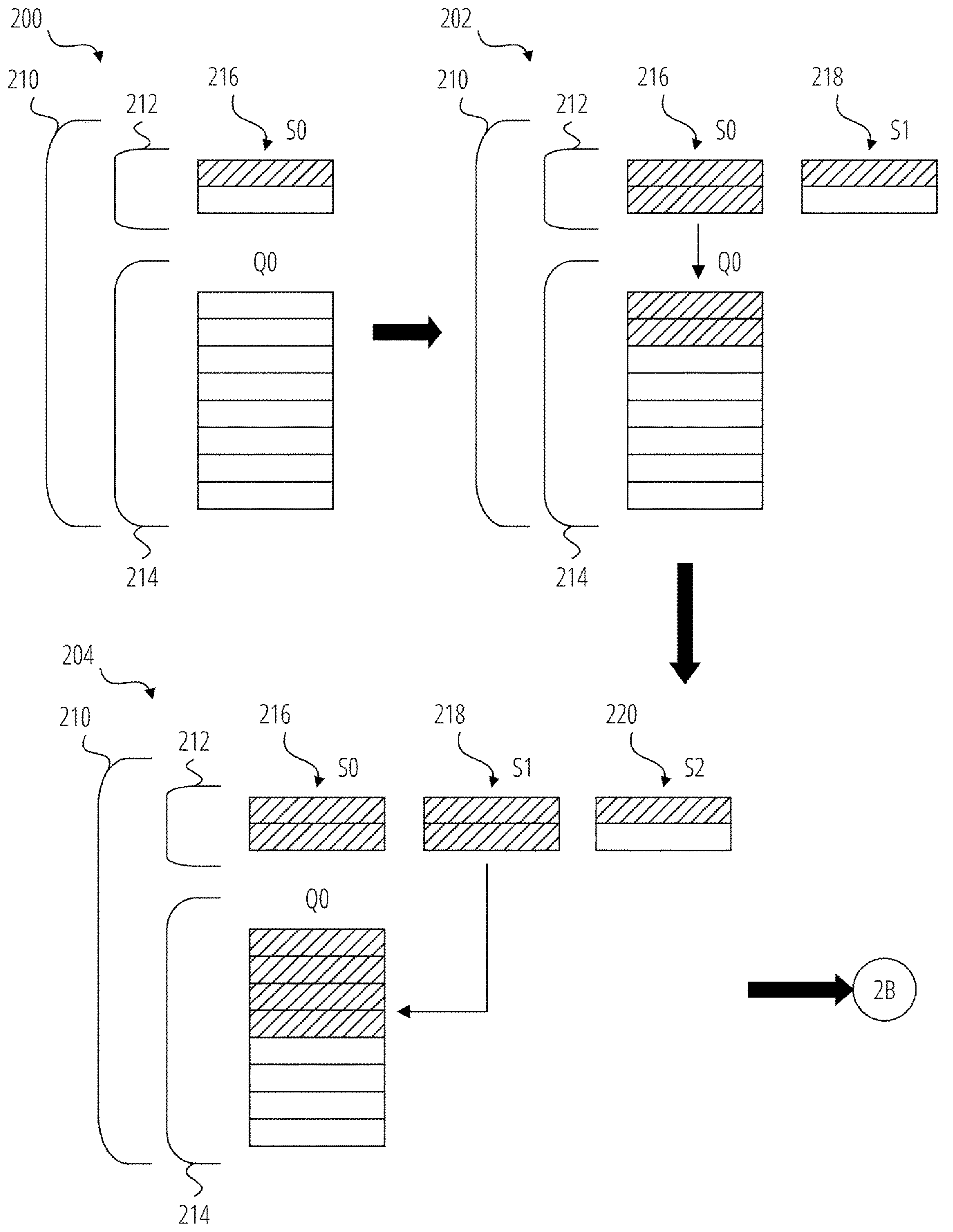
FIG. 2A and FIG. 2B are block diagrams illustrating operations of an example block caching architecture on a zone-based memory sub-system, in accordance with some embodiments of the present disclosure.
Figure 2B:
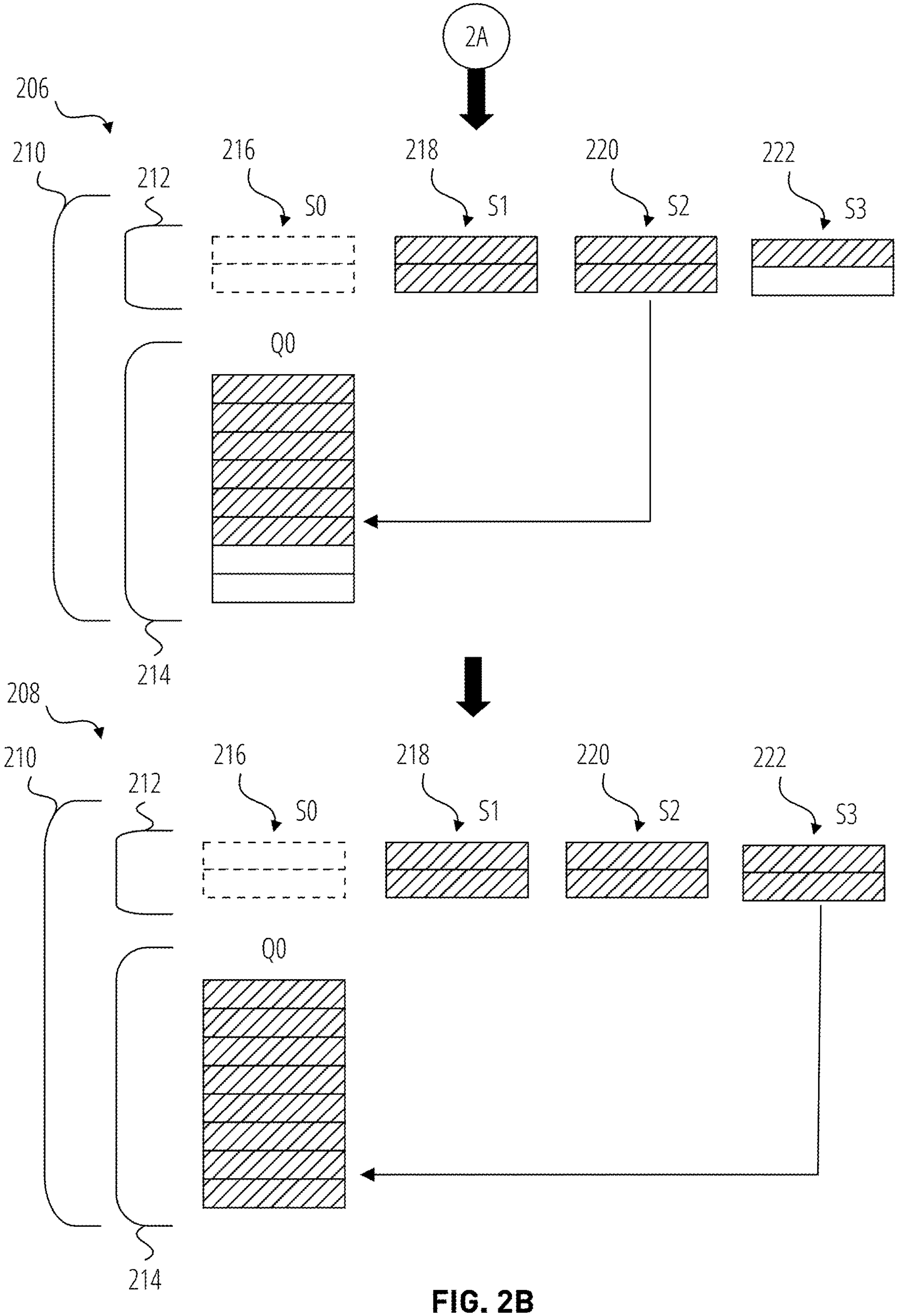

For a 3SLC/1QLC (or 3S/1Q) architecture implemented on a zone-based memory sub-system, a single QLC blockset (e.g., comprising two QLC blocks) is mapped to a zone and up to three SLC blocksets are temporarily mapped to the zone to facilitate SLC-block caching with respect to the single QLC blockset. Operations of an example block caching architecture (e.g., 3S/1Q architecture) are illustrated with respect to FIG. 2A and FIG. 2B. In FIG. 2A and FIG. 2B, a zone 210 comprises one or more SLC blocksets 212 and a QLC blockset 214 (Q0). Referring now to FIG. 2A, when the zone 210 is open, a single, first SLC blockset 216 (S0) is allocated and mapped to the zone 210, and the QLC blockset 214 is allocated and mapped to the 210. During stage 200, as a host system starts writing data to the zone 210, data is buffered in the first SLC blockset 216 of the one or more SLC blocksets 212 and not written (copied back) to the QLC blockset 214 until there is enough data in the first SLC blockset 216. At stage 202, as the host system continues to write data to the zone 210 and the first SLC blockset 216 becomes full, a second SLC blockset 218 (S1) is allocated and mapped to the zone 210, data begins to be written to the second SLC blockset 218, and data stored (e.g., cached) in the first SLC blockset 216 is written (or copied back) to the QLC blockset 214. The first SLC blockset 216 is not released (e.g., unmapped or disassociated) from the zone 210 during stage 202. Thereafter at stage 204, as the host system continues to write data to the zone 210 and the second SLC blockset 218 becomes full, a third SLC blockset 220 (S2) is allocated and mapped to the zone 210, data begins to be written to the third SLC blockset 220, and data stored (e.g., cached) in the second SLC blockset 218 is written (or copied back) to the QLC blockset 214. The second SLC blockset 218 is not released (e.g., unmapped or disassociated) from the zone 210 during stage 204.

Referring now to FIG. 2B, at stage 206, as the host system continues to write data to the zone 210 and the fourth SLC blockset 222 becomes full, a fourth SLC blockset 222 (S3) is allocated and mapped to the zone 210, data begins to be written to the fourth SLC blockset 222, and data stored (e.g., cached) in the third SLC blockset 220 is written (or copied back) to the QLC blockset 214. If during stage 206, the fourth SLC blockset 222 is filled to a certain percentage, a read verify operation is performed on at least a portion (e.g., ¼) of the QLC blockset 214 to which data from the first SLC blockset 216 was written (e.g., copied back). During a read verify operation on a block, data is read from a block and considered verified if the read data can be successfully decoded. If the read verify operation performed on at least the portion (e.g., ¼) of the QLC blockset 214 results in a successful verification, the first SLC blockset 216 can be released (e.g., unmapped or disassociated) from the zone 210 (as shown in stage 206), thereby enabling the first SLC blockset 216 to be reallocated for reuse (e.g., different use). If, however, the read verify operation performed on at least the portion (e.g., ¼) of the QLC blockset 214 does not result in a successful verification, the first SLC blockset 216 is not released (e.g., unmapped or disassociated) from the zone 210 and a memory sub-system would need to handle the error of the unsuccessful verification to ensure data integrity of the zone 210.

During stage 208, as the host system continues to write data to the zone 210 and the fourth SLC blockset 222 becomes full, data stored (e.g., cached) in the fourth SLC blockset 222 is written (or copied back) to the QLC blockset 214. Additionally, during stage 208, a read verify operation is performed on remaining portions (e.g., ¾) of the QLC blockset 214 to which data from the second SLC blockset 218, the third SLC blockset 220, and the fourth SLC blockset 222 was written (e.g., copied back). If the read verify operation performed on the remaining portions (e.g., ¾) of the QLC blockset 214 results in a successful verification, the second SLC blockset 218, the third SLC blockset 220, and the fourth SLC blockset 222 can be released (e.g., unmapped or disassociated) from the zone 210 (as shown in stage 206), thereby enabling each of the second SLC blockset 218, the third SLC blockset 220, and the fourth SLC blockset 222 to be reallocated for reuse (e.g., different use). If, however, the read verify operation performed on the remaining portions (e.g., ¾) of the QLC blockset 214 does not result in a successful verification, the second SLC blockset 218, the third SLC blockset 220, and the fourth SLC blockset 222 are not released (e.g., unmapped or disassociated) from the zone 210 and a memory sub-system would need to handle the error of the unsuccessful verification(s) to ensure data integrity of the zone 210.

While the 3S/1Q architecture and similar architectures, such as 6SLC/2QLC (or 6S/1Q), offer a balanced approach to data performance and storage efficiency on a memory sub-system, it introduces complexities in data management, especially during the migration phases. Handling programming and reading of cache and non-cache blocks effectively is crucial, as failures in these operations can lead to data loss or corruption. For example, a read failure can occur while a data read is being performed on one or more pages of one or more cache blocks (e.g., SLC cache blocks) during an internal memory sub-system operation, such as a cache-to-non-cache data migration (e.g., copyback) operation, a cache block refresh (e.g., SLC refresh), or when a controller finishes a partially written zone. In another example, data stored on a cache block (e.g., a page of the cache block) may be unable to be read back despite best efforts and multiple retries, resulting in an uncorrectable error status (e.g., Uncorrectable Error Code Correction (UECC) status, such as a SLC UECC). Unfortunately, conventional approaches for handling a block read failure (e.g., SLC or QLC UECC read error) can be insufficient for use with zone memory sub-systems, given how data is written and managed. Typically, when a memory sub-system is unable to read back host data despite the memory sub-system's best effort and retries, conventional read failure handling would complete the command with a UECC error status.

Various embodiments described herein provide for handling block read failure in a memory sub-system that supports zones. In particular, some embodiments described herein handle block read failure during a data read (e.g., host data write) of a cache block or a non-cache block of a zone on a memory device on a memory sub-system, block read failure during refresh of a cache block or a non-cache block of a zone on a memory device on a memory sub-system, block read failure during migration of data between a cache block and a non-cache block of a zone on a memory device on a memory sub-system, or some combination thereof.

The memory sub-system of some embodiments provides enhanced data integrity (e.g., by relocating the data on detection of SLC or QLC UECC to swiftly handle read failures), and reduced downtime (e.g., quick recovery from read failures, thereby enhancing overall reliability and user experience). Various embodiments provide read failure handling with minimal impact on quality-of-service (QoS), and handle read UECC from partially written, fully written block or during refresh. The memory sub-system of some embodiments can enhance data integrity and system reliability (e.g., in solid-state drives (SSDs)) using a zone architecture (e.g., ZNS architecture), such as 3S/1Q architecture or the like. Additionally, the memory sub-system of some embodiments can incorporate advanced mechanisms for handling read failures in both cache and non-cache blocksets, ensuring robust data management and recovery processes. Specifically, the memory sub-system of some embodiments is structured around the use of SLC cache blocks and QLC non-cache blocks, organized into zones, where zone data integrity on read failure (e.g., during the SLC→QLC and QLC→QLC data movement) can be maintained, which can cover read failure during host data write and SLC or QLC refresh (e.g., during a wear leveling process, a garbage collection process, a media scan process, a read disturb process, or another background process). Each zone can be mapped to specific blocksets, with multiple SLC blocksets of a single zone serving as a high-speed cache and a single QLC blocksets of the single zone being used for long-term data storage. This configuration can leverage the fast data access and data write capabilities of SLC blocks while benefiting from the high-density data storage and cost-effectiveness of QLC blocks.

As used herein, an uncorrectable read failure comprises a read failure of a block (e.g., a page of a block) after requested data cannot be successfully read from the block, even after execution of one or more read recovery approaches/mechanisms, such as using error correction mechanisms. An example of the uncorrectable read failure includes an Uncorrectable Error Code Correction (UECC) error status during a data read operation. For instance, an UECC error status occurring during a read of a SLC block (e.g., SLC cache block) can be referred to a SLC UECC, and an UECC error status occurring during a read of a QLC block (e.g., QLC non-cache block) can be referred to a QLC UECC.

According to some embodiments, a memory sub-system handles a cache block uncorrectable read failure (e.g., SLC UECC error) on a host read. Initially, the memory sub-system can attempt to read data from a QLC blockset. If this read fails, an "Unrecoverable Read Error" status can be communicated to a host system. Conversely, if the read is successful, the correct data can be returned to the host system. Concurrently, the memory sub-system can manage the SLC blockset experiencing UECC by completing any ongoing programming and queued programs. Subsequently, the memory sub-system can finalize the affected zone and can initiate an Error QLC Blockset Refresh, which can involve transferring data from the SLC blockset to the QLC blockset, and which can use SLC cache data for padding. The source SLC blockset can be retired (e.g., post-validation of data invalidity), and the memory sub-system can be assessed for potential SLC capacity shortages that might necessitate a planeset retirement.

According to some embodiments, a memory sub-system handles a cache block uncorrectable read failure (e.g., SLC UECC error) during a cache block to cache block (e.g., SLC block to SLC block) refresh process in the memory sub-system. The process can begin by marking UECC in the metadata of the read-failed page, and can allow the refresh process to continue. The memory sub-system can complete the affected zone and can initiate an Error QLC Blockset Refresh, which can involve transferring data from the SLC blockset to the QLC blockset, and which can use SLC cache data for padding. The refresh can be followed by the retirement of the source SLC blockset once all data within it are confirmed as invalid. Additionally, the memory sub-system can check for potential SLC capacity shortages that could necessitate the retirement of a planeset.

According to some embodiments, a memory sub-system handles a cache block uncorrectable read failure (e.g., SLC UECC error) during a cache block to non-cache block (e.g., SLC block to QLC block) migration (e.g., copyback) process in the memory sub-system. Initially, any ongoing SLC programming can be completed, along with any programs that are queued in the current SLC blockset. Following this, the memory sub-system can finalize the affected zone and can trigger an Error QLC Blockset Refresh, which can involve transferring data from the SLC blockset to the QLC blockset, and which can use SLC cache data for padding. Subsequently, the source SLC blockset can be retired after confirming that all data within it are invalid. Additionally, the memory sub-system can evaluate the potential for SLC capacity shortages that might require a planeset retirement.

According to some embodiments, a memory sub-system handles a non-cache block uncorrectable read failure (e.g., QLC UECC error) on a host read, or an internal scan read in the memory sub-system. Upon encountering a QLC UECC, the memory sub-system can first return an "Unrecoverable Read Error" status to the host. Subsequently, the affected zone can be marked as read-only state, and the host system can be advised to take the zone offline. To manage data integrity, the memory sub-system can migrate any available SLC cache data to the QLC blockset and can add padding. Following these steps, the QLC blockset can be retired after the zone is taken offline. Additionally, to compensate for the capacity loss due to the retirement of the QLC blockset, an empty zone can be taken offline.

According to some embodiments, a memory sub-system handles a non-cache block uncorrectable read failure (e.g., QLC UECC error) during a non-cache block to non-cache block (e.g., QLC block to QLC block) refresh process in the memory sub-system. The memory sub-system can differentiate between QLC UECC occurrences during coarse and fine programming stages. If QLC UECC occurs during coarse programming, the affected zone can be moved to a read-only state, UECC can be marked in the metadata, and the refresh process can continue until the QLC blockset is retired after the zone is taken offline. Conversely, if UECC occurs during fine programming, the zone can be also moved to a read-only state, and the current refresh can be aborted. The memory sub-system can open another QLC blockset and can restart the refresh using the other QLC blockset, while marking UECC in the metadata of this new refresh. The original destination QLC blocksets can be moved to the garbage collection pool, and the QLC blockset can be retired.

While various embodiments are described herein with respect to a 3S/1Q architecture, various embodiments can be adapted to be implemented with respect to other (e.g., similar) architectures, such as a 6S/1Q architecture.

As used herein, a planeset can comprise two or more planes of a memory die (e.g., NAND-type memory die), which can be part of a memory device (e.g., a NAND-type memory device). For instance, a planset0 can comprise plane0 and plane1 of a memory die, and a planset1 can comprise plane 2 and plane 3 of the memory die. A blockset can comprise one or more blocks of a memory device (e.g., a NAND-type memory device). For example, a blockset can comprise multiple blocks of a memory device (e.g., a NAND-type memory device) from different planesets (e.g., two blocks—one block from planeset0 and another block from planeset1). A SLC blockset can comprise one or more SLC blocks of a memory device (e.g., a NAND-type memory device), and a QLC blockset can comprise one or more QLC blocks of a memory device (e.g., a NAND-type memory device) of a memory sub-system. One or more SLC blocksets can be used for SLC caching on a memory device (e.g., a NAND-type memory device) of a memory sub-system.

As used herein, an erase status failure (ESF) can refer to a failure to erase a block (e.g., SLC block) on a memory device (e.g., a NAND-type memory device). A program status failure (PSF) or program failure (PF) can refer to a failure to program a block (e.g., SLC block) on a memory device (e.g., a NAND-type memory device) with data (e.g., write data to the NAND-type memory device). A grown bad block (GBB) can refer to a block of a memory device (e.g., a NAND-type memory device) that is marked as bad (e.g., unusable or unavailable) during operation of the memory device. An uncorrectable error (UECC) can refer to an error when reading data from a block of a memory device (e.g., a NAND-type memory device), where the error cannot be corrected by an error correction mechanism (e.g., error correction parity).

As used herein, a zone can comprise a contiguous range of logical addresses (e.g., logical block addresses) that is managed within a memory sub-system as a single unit. For example, a zone can be mapped to one or more blocksets. Once a zone is marked as finished by a controller (e.g., marked as zone finished by controller (ZFC)), the controller of a memory sub-system can prevent data from being written to the zone, but does not prevent data from being read from, the zone.

Disclosed herein are some examples of handling block read failure in a memory sub-system that supports zones, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM EXPRESS (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LB A, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a block read failure handler with zone support 113 (hereafter, the block read failure handler 113) that enables or facilitates block read failure handling with respect to zones of the memory sub-system 110 in accordance with various embodiments described herein. Alternatively, some or all of the block read failure handler 113 is included by the local media controller 135, thereby enabling the local media controller 135 to enable or facilitate block read failure handling with respect to zones of the memory sub-system 110.

As described herein, FIG. 2A and FIG. 2B are block diagrams illustrating operations of an example block caching architecture (e.g., 3S/1Q architecture) on a zone-based memory sub-system, in accordance with some embodiments of the present disclosure.

FIG. 3A through FIG. 9B are flow diagrams of example methods for handling block read failure on a memory sub-system that supports zones, in accordance with some embodiments of the present disclosure. Any of 300, 400, 500, 600, 700, 800, 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, any one of methods 300, 400, 500, 600, 700, 800, 900 is performed by the memory sub-system controller 115 of FIG. 1 based on the block read failure handler 113. Additionally, or alternatively, for some embodiments, any one of methods 300, 400, 500, 600, 700, 800, 900 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible. Methods 300, 400, 500, 600 relate to handling read failure of cache blocks, while methods 700, 800, 900 relate to handling read failure of non-cache blocks.

Figure 3A:
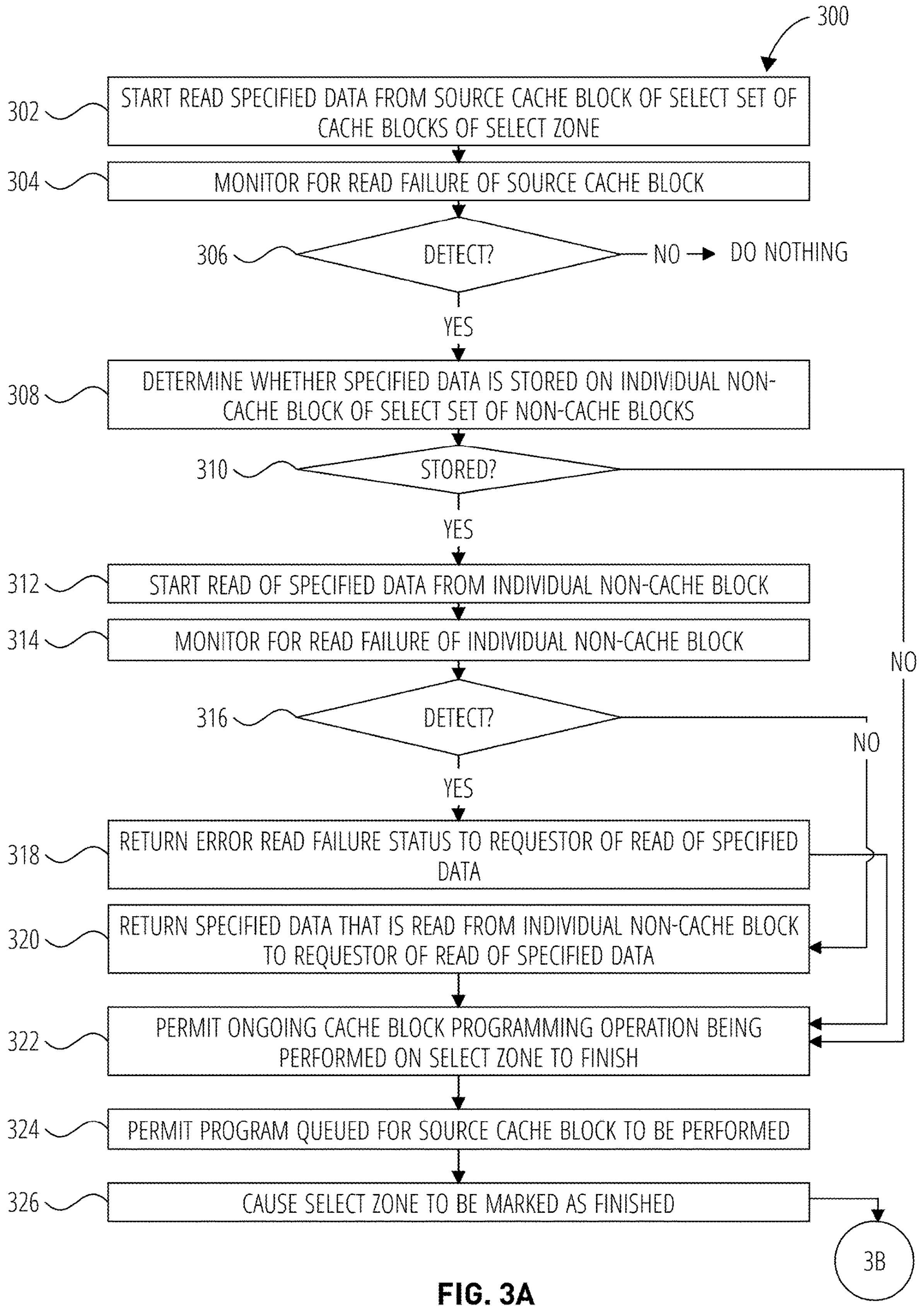
FIG. 3A through FIG. 9B are flow diagrams of example methods for handling block read failure on a memory sub-system that supports zones, in accordance with some embodiments of the present disclosure.

Referring now to FIG. 3A, the method 300 illustrates an example method for handling block read failure during a data read (e.g., host data read or internal scan read) of a cache block (e.g., SLC cache block) of a zone on a memory sub-system that supports zones. At operation 302, a processing device (e.g., the processor 117 of the memory sub-system controller 115) starts read of specified data from a source cache block of the select set of cache blocks of a select zone on a memory device (e.g., memory device 130). For various embodiments, the memory device comprises a set of zones for storing data, and the select zone (of the set of zones) comprises a select set of cache blocks and a select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification.

While the specified data is being read from the source cache block, at operation 304, the processing device (e.g., the processor 117 of the memory sub-system controller 115) monitors (e.g., detects) for a read failure of the source cache block. At decision block 306, in response to the read failure being detected by operation 304, the method 300 proceeds to operation 308. Alternatively, at decision block 306, in response to the read failure not being detected by operation 304, the method 300 does nothing and the reading of the specified data from the source cache block is assumed to have been completed without read failure.

At operation 308, the processing device (e.g., the processor 117 of the memory sub-system controller 115) determines whether the specified data is stored on an individual non-cache block of the select set of non-cache blocks. At decision block 310, in response to determining that the specified data is stored on the individual non-cache block, the method 300 proceeds to operation 312, otherwise the method 300 proceeds to operation 322. At operation 312, the processing device starts read of the specified data from the individual non-cache block and, at operation 314, the processing device monitors for a read failure of the individual non-cache block. Thereafter, at decision block 316, in response to detecting the read failure of the individual non-cache block, the method 300 proceeds to operation 318, where the processing device returns an error read failure status (e.g., "Unrecoverable Read Error" status) to a requestor (e.g., host system 120) of the read of the specified data. For various embodiments, the read failure is an uncorrectable read failure, such as a UECC error (e.g., SLC UECC error). After operation 318, the method 300 proceeds to operation 322. Alternatively, at decision block 316, in response to not detecting the read failure of the individual non-cache block, the method 300 proceeds to operation 320, where the processing device returns the specified data, read from the individual non-cache block (by read started at operation 312), to a requestor of the read of the specified data. After operation 320, the method 300 proceeds to operation 322.

During operation 322, the processing device (e.g., the processor 117 of the memory sub-system controller 115) permits an ongoing cache block programming operation being performed on the select zone to finish and, at operation 324, the processing device permits a program queued for the source cache block to be performed. After operations 322 and 324, the method 300 proceeds to operation 326, where the processing device causes the select zone to be marked as finished.

Figure 3B:
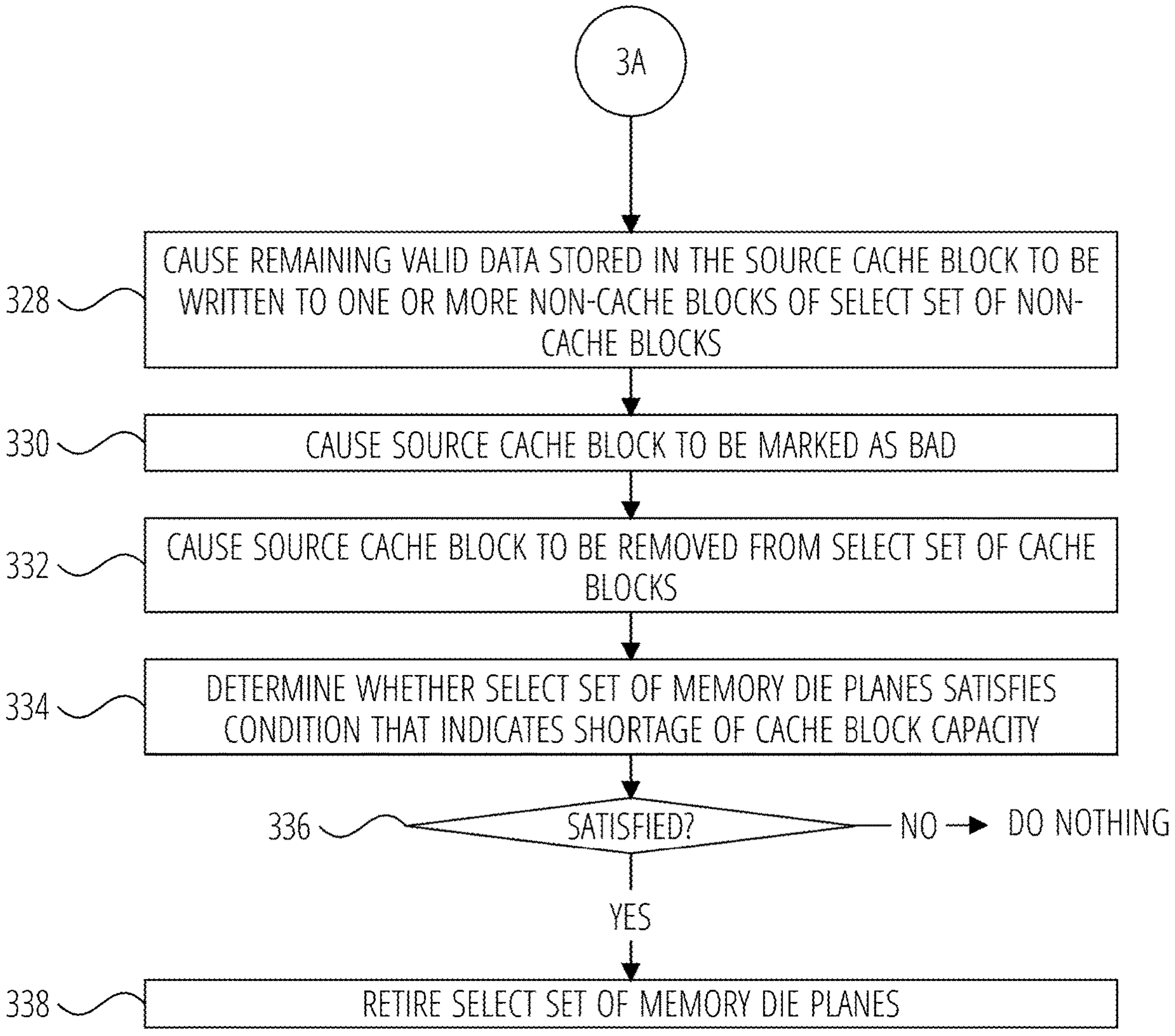

Referring now to FIG. 3B, after operation 326, the method 300 proceeds to operation 328, where the processing device (e.g., the processor 117 of the memory sub-system controller 115) causes remaining valid data (e.g., readable data) stored in the source cache block to be written to one or more non-cache blocks of the select set of non-cache blocks. During operation 328, data written from the source cache block to the or more non-cache blocks can be padded with other data, such as data from one or more cache blocks (e.g., one or more SLC cache blocks). Following operation 328, at operation 330, the processing device causes the source cache block to be marked as bad (e.g., GBB) and, at operation 332, the processing device causes the source cache block to be removed from the select set of cache blocks (e.g., the source cache block is released from the select zone). After operation 332, the method 300 proceeds to operation 334.

During operation 334, the processing device determines whether a select set of memory die planes of the memory device that includes the source cache block satisfies a condition that indicates a shortage of cache block capacity of the memory device (e.g., number of available cache blocks are below a threshold number). At decision block 336, in response to determining that the select set of memory die planes of the memory device satisfies the condition, the method 300 proceeds to operation 338, where the processing device retires the select set of memory die planes. In retiring the select set of memory die planes, cache blocks from the select set of memory die planes can be prevented from being allocated for use. Alternatively, at decision block 336, in response to determining that the select set of memory die planes of the memory device does not satisfy the condition, the method 300 does nothing.

Figure 4:
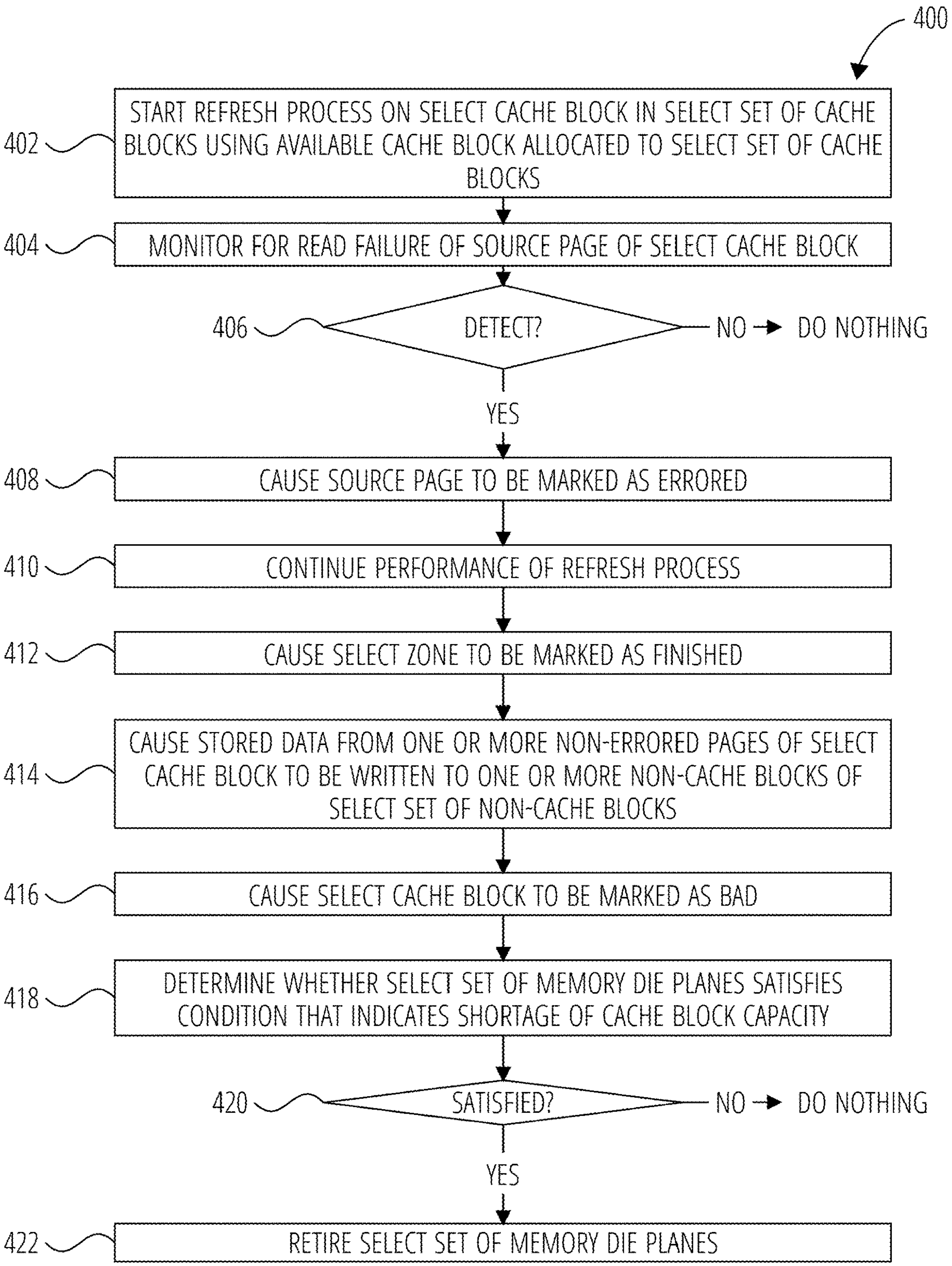

Referring now to FIG. 4, the method 400 illustrates an example method for handling block read failure during refresh of a cache block (e.g., SLC cache block refresh) of a zone on a memory sub-system that supports zones. At operation 402, a processing device (e.g., the processor 117 of the memory sub-system controller 115) starts a refresh process on a select cache block in a select set of cache blocks of a select zone using an available cache block allocated to a select set of cache blocks of the select zone, where a memory device (e.g., memory device 130) comprises a set of zones for storing data, and the select zone (of the set of zones) comprises the select set of cache blocks and a select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification. Depending on the embodiment, the refresh process can be started (e.g., triggered) on the select cache block as part of a wear leveling process, a garbage collection process, a media scan process, a read disturb process, or another background process being performed on the select cache block.

While the refresh process is being performed, at operation 404, the processing device (e.g., the processor 117 of the memory sub-system controller 115) monitors (e.g., detects) for a read failure (e.g., RF status) of a source page of the select cache block. At decision block 406, in response to the read failure being detected by operation 404, the method 400 proceeds to operation 408. Alternatively, at decision block 406, in response to the read failure not being detected by operation 404, the method 400 does nothing and the refresh process is assumed to have been completed without read failure.

At operation 408, the processing device (e.g., the processor 117 of the memory sub-system controller 115) causes the source page to be marked as errored (e.g., mark UECC in the metadata of the source page, which represents a failed page or a read failure (RF) page). Thereafter, during operation 410, the processing device continues performance of the refresh process of the cache block (e.g., continue the SLC cache block refresh). At operation 412, the processing device causes the select zone to be marked as finished. At operation 414, the processing device causes stored data from one or more non-errored pages (e.g., pages not marked with UECC) of the select cache block to be written to one or more non-cache blocks of the select set of non-cache blocks. Additionally, at operation 416, the processing device causes the select cache block to be marked as bad (e.g., GBB). Thereafter, the select cache block can be removed from the select set of cache blocks of the select zone (e.g., the select cache block is released from the select zone).

After the causing of the select cache block in the select set of cache blocks to be marked as bad, at operation 418, the processing device (e.g., the processor 117 of the memory sub-system controller 115) determines whether a select set of memory die planes of the memory device that includes the select cache block satisfies a condition that indicates a shortage of cache block capacity of the memory device (e.g., number of available cache blocks are below a threshold number). At decision block 420, in response to determining that the select set of memory die planes of the memory device satisfies the condition, the method 400 proceeds to operation 422, where the processing device retires the select set of memory die planes. In retiring the select set of memory die planes, cache blocks from the select set of memory die planes can be prevented from being allocated for use. Alternatively, at decision block 420, in response to determining that the select set of memory die planes of the memory device does not satisfy the condition, the method 400 does nothing.

Figure 5:
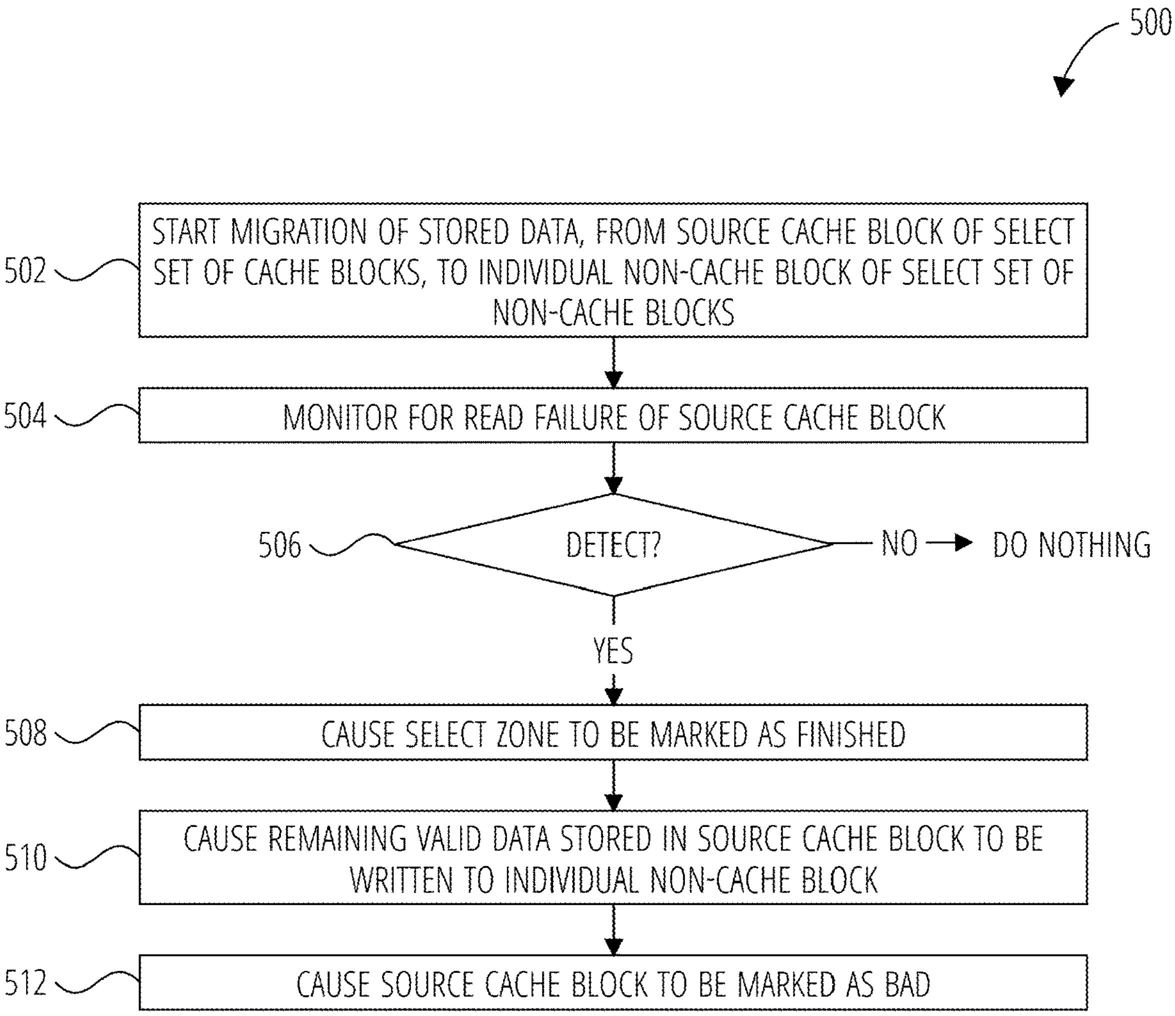

Referring now to FIG. 5, the method 500 illustrates an example method for handling block read failure of a cache block during migration of stored data between from the cache block (e.g., SLC cache block) and a non-cache block (e.g., QLC non-cache block) of a zone on a memory sub-system that supports zones. At operation 502, a processing device (e.g., the processor 117 of the memory sub-system controller 115) starts migration of stored data, from a source cache block of a select set of cache blocks of a select zone on a memory device (e.g., memory device 130), to an individual non-cache block of a select set of non-cache blocks of the select zone. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification.

While the migration is being performed, at operation 504, the processing device (e.g., the processor 117 of the memory sub-system controller 115) monitors (e.g., detects) for a read failure of the source cache block. At decision block 506, in response to the read failure being detected by operation 504, the method 500 proceeds to operation 508. Alternatively, at decision block 506, in response to the read failure not being detected by operation 504, the method 500 does nothing and the migration of data is assumed to have been completed without read failure.

At operation 508, the processing device (e.g., the processor 117 of the memory sub-system controller 115) causes the select zone to be marked as finished and, at 510, the processing device causes remaining valid data (e.g., readable data) stored in the source cache block to be written to the individual non-cache block. Eventually, at operation 512, the processing device causes the source cache block to be marked as bad (e.g., GBB). Thereafter, the source cache block can be removed from the select set of cache blocks of the select zone (e.g., the source cache block is released from the select zone).

Figure 6A:
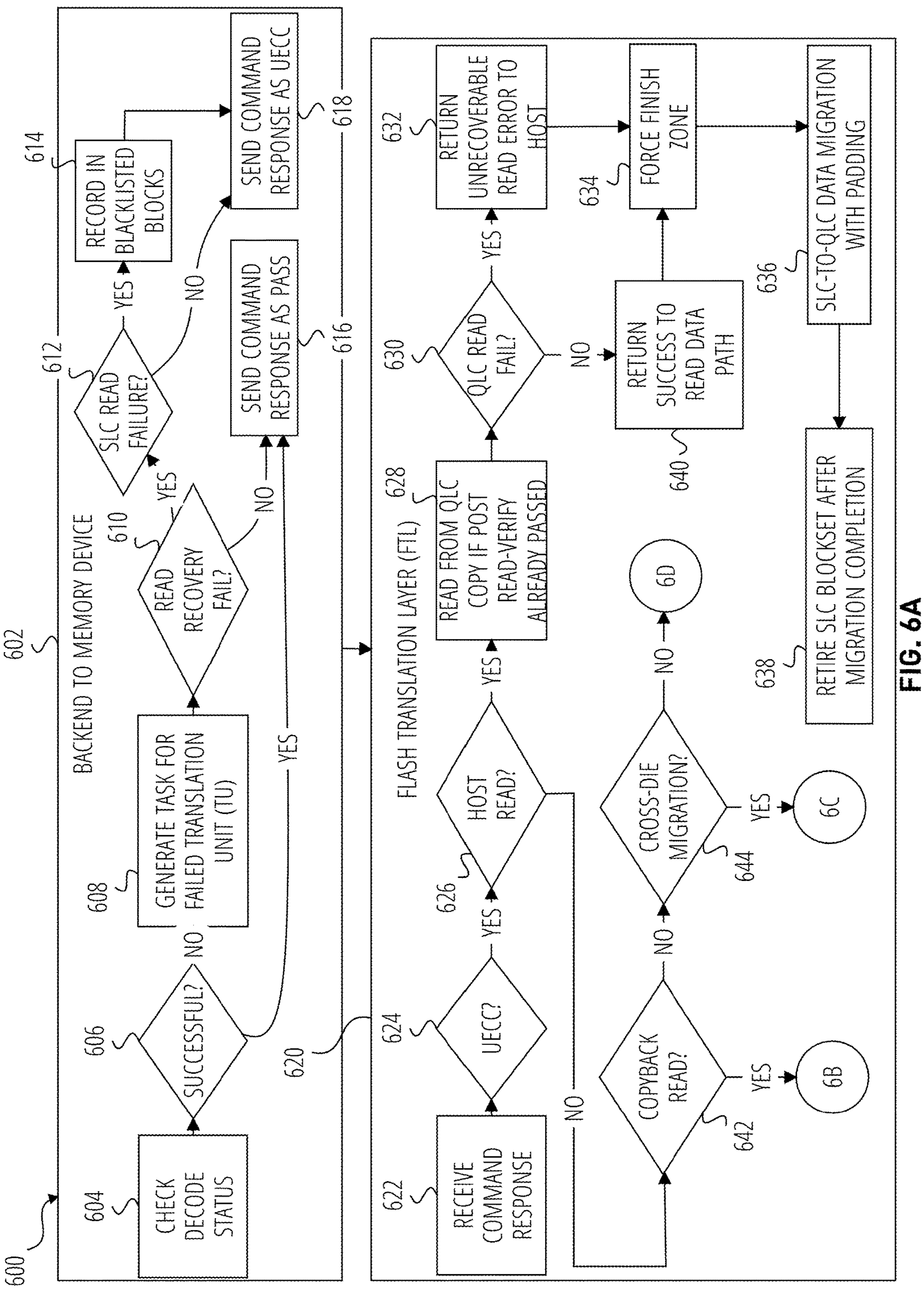

Referring now to FIG. 6A, the method 600 illustrates an example implementation of methods 300, 400, 500 with respect to SLC cache blocks and QLC non-cache blocks of a memory sub-system that supports zones. As shown, the method 600 is implemented with respect to a backend to memory device 602 of a memory sub-system (e.g., 110) and a flash translation layer (FTL) 620 of the memory sub-system. At operation 604, the backend to memory device 602 checks a decode status of a page (e.g., a translation unit of the page) of a SLC cache block to determine whether decoding of the page was successful or failed, where a decode failure can represent a read error. At decision block 606, in response to the decode being successful, the method 600 proceeds to block operation 616, where the backend to memory device 602 sends a pass command response to the FTL 620. Alternatively, at decision block 606, in response to the decode not being successful, the method 600 proceeds to operation 608, where the backend to memory device 602 generates a task to perform a read recovery process for a failed translation unit of the page that caused the decode failure.

After operation 608, at decision block 610, in response to the read recovery process failing, the method 600 proceeds to decision block 612, otherwise the method 600 proceeds to operation 616. At operation decision block 612, in response to the read recovery failure being associated with a SLC read failure, the method 600 proceeds to operation 614, where the backend to memory device 602 records the SLC cache block in a list of blacklisted blocks. After operation 614, the method 600 proceeds to operation 618, where the backend to memory device 602 sends a UECC command response to the FTL 620. Alternatively, at decision block 610, in response to the read recovery process being successful, the method 600 proceeds to operation 616. At operation 616, the backend to memory device 602 sends a UECC command response to the FTL 620. Alternatively, at decision block 610, in response to the read recovery process being successful, the method 600 proceeds to operation 616, where the backend to memory device 602 sends a pass command response to the FTL 620.

The FTL 620 receives the command response for SLC cache block from the backend to memory device 602 (at operation 622). At decision block 624, in response to the command response being a UECC command response, the method 600 proceeds to decision block 626. Alternatively, at decision block 624, in response to the command response being a pass command response, a normal path of read command flow is followed (not shown).

At decision block 626, in response to the UECC command response being associated with a host read, the method 600 proceeds to operation 628, otherwise the method 600 proceeds to operation decision block 642.

At operation 628, the FTL 620 reads a copy of the host-requested data from a QLC blockset of the zone (associated with the SLC cache block) if a read-verify operation for the QLC blockset has passed. Thereafter, at decision block 630, in response to the read from the QLC blockset failing, the method 600 proceeds to operation 632, otherwise the method 600 proceeds to operation 640, which is followed by operation 634. At operation 640, the FTL 620 returns a success status to a read data path. At operation 634, the FTL 620 forces the zone to finish.

At operation 632, the FTL 620 returns an unrecoverable read error to the host (e.g., to a host system 120). Thereafter, the method 600 proceeds to operation 634, where the FTL 620 forces the zone to finish.

After operation 634, at operation 636, the FTL 620 performs a SLC-to-QLC data migration on the SLC blockset (that includes the SLC cache block) with data padding and, at operation 638, the FTL 620 retires the SLC blockset after the data migration is completed.

At decision block 642, in response to the UECC read failure being associated with a copyback, the method 600 proceeds to operation 646 (shown in in FIG. 6B), otherwise the method 600 proceeds to decision block 644. At decision block 644, in response to the UECC read failure being associated with a cross-die data migration, the method 600 proceeds to operation 656 (shown in FIG. 6C), otherwise the method 600 proceeds to operation 664 (shown in FIG. 6D).

Figure 6B:
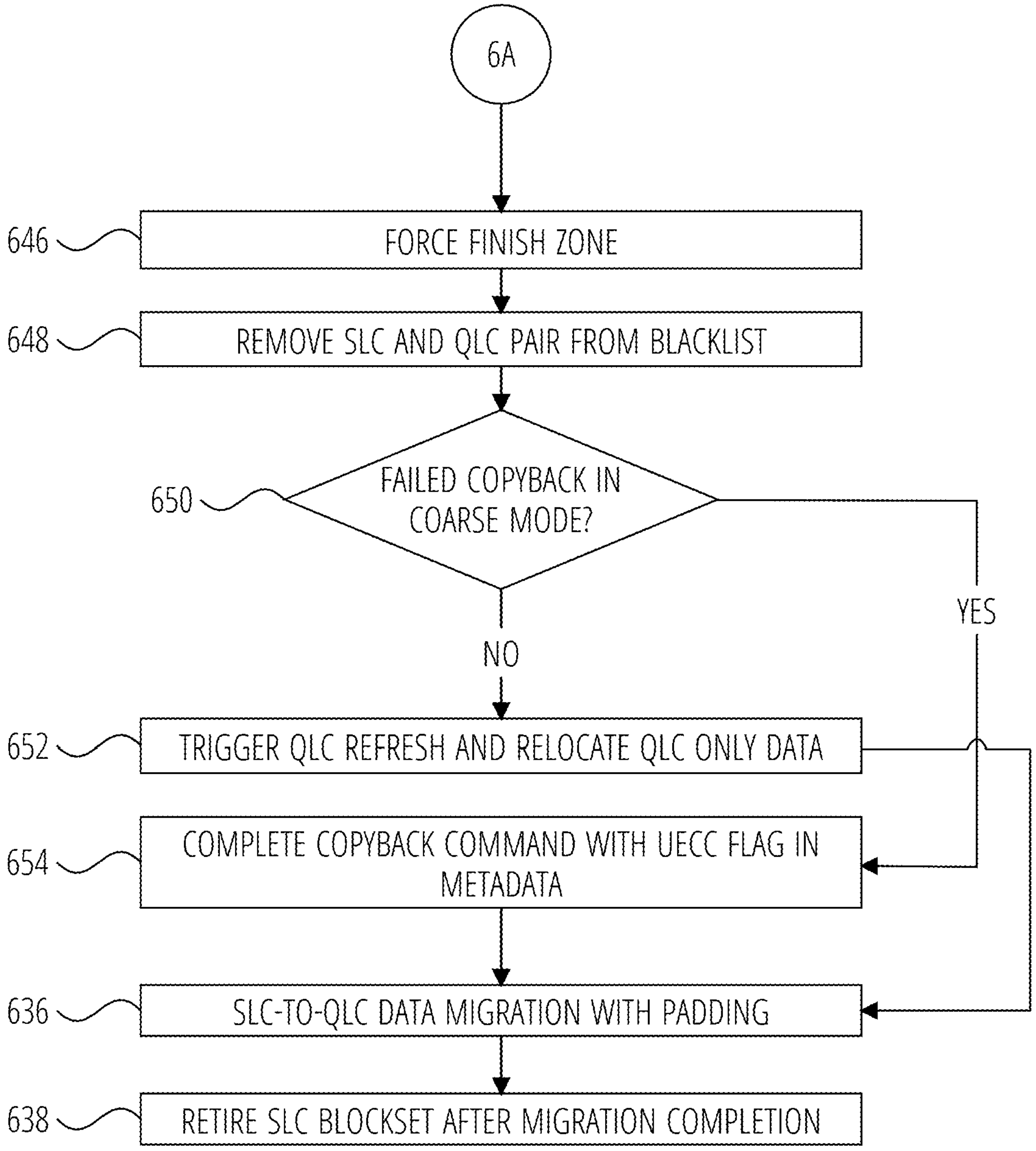

Referring now to FIG. 6B, at operation 646, the FTL 620 forces the zone to finish and, at operation 648, the FTL 620 removes the SLC blockset and the QLC blockset from a list of blacklisted blocks. Thereafter, at decision block 650, in response to the failed copyback occurring during a coarse programming mode, the method 600 proceeds to operation 654, otherwise the method 600 proceeds to operation 652.

At operation 652, the FTL 620 triggers a QLC refresh process and relocates only QLC data. Thereafter, the method 600 proceeds to operation 636.

At operation 654, the FTL 620 completes the copyback command with a UECC flag in the metadata of the page of the SLC cache block. Thereafter, the method 600 proceeds to operation 636.

At operation 636, the FTL 620 performs a SLC-to-QLC data migration on the SLC blockset (that includes the SLC cache block) with padding and, at operation 638, the FTL 620 retires the SLC blockset after the data migration is complete.

Figure 6C:
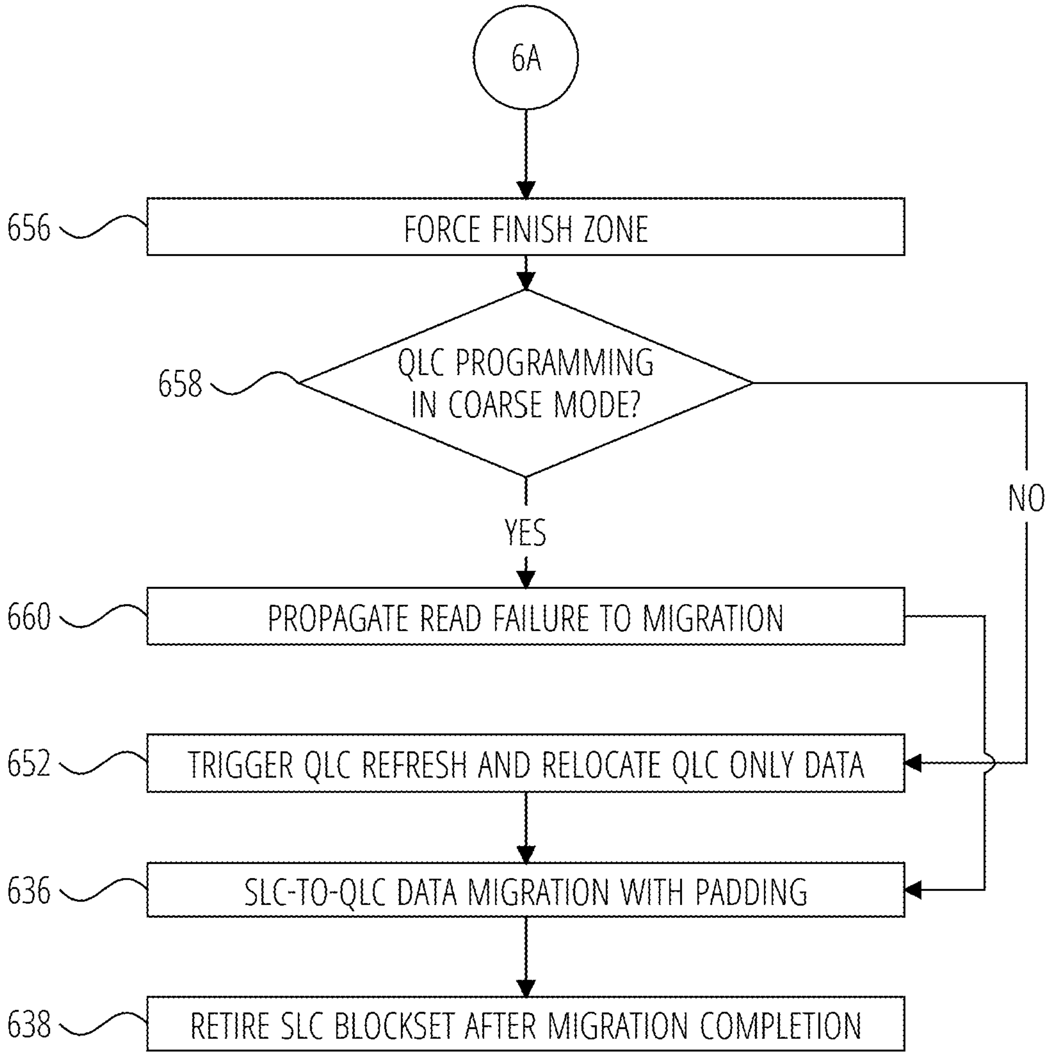

Referring now to FIG. 6C, at operation 656, the FTL 620 the FTL 620 forces the zone to finish and, thereafter, the method 600 proceeds to decision block 658. At decision block 658, in response to the QLC programming being in coarse mode, the method 600 proceeds to operation 660, otherwise it is assumed that the QLC programming is performed in fine mode and the method 600 proceeds to operation 652.

At operation 660, the FTL 620 propagates the read failure to the data migration and, thereafter, the method 600 proceeds to operation 636. At operation 652, the FTL 620 triggers a QLC refresh and relocates only QLC data, and then the method 600 proceeds to operation 636.

As previously noted, at operation 636, the FTL 620 performs a SLC-to-QLC data migration on the SLC blockset (that includes the SLC cache block) with padding and, at operation 638, the FTL 620 retires the SLC blockset after the data migration is complete.

Figure 6D:
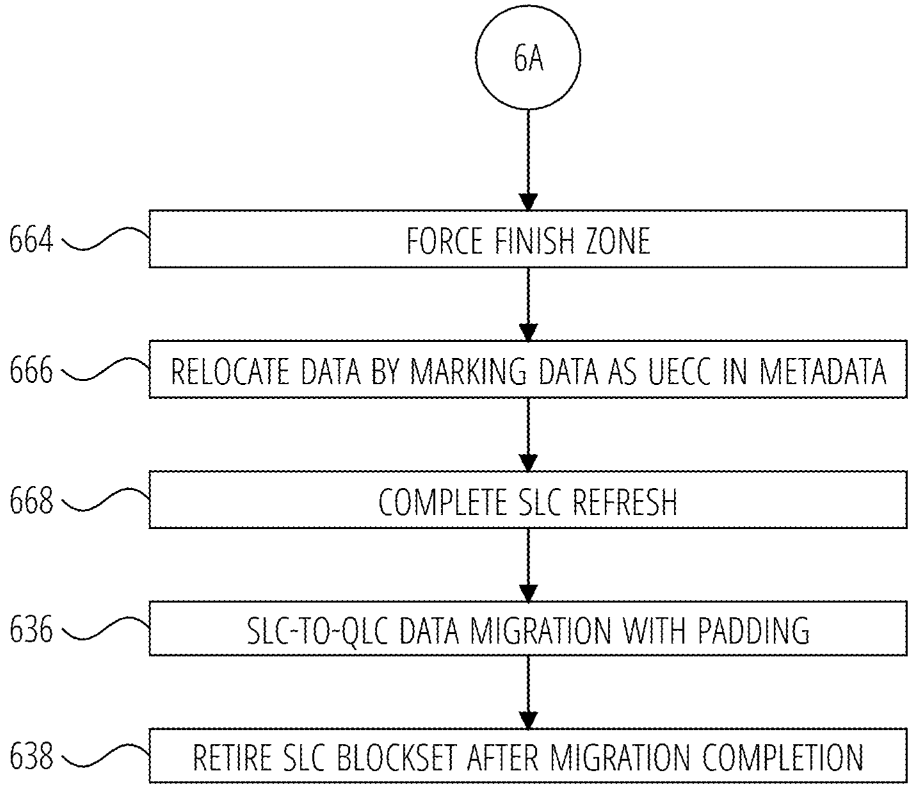

Referring now to FIG. 6D, at operation 664, the FTL 620 forces the zone to finish and, at operation 666, the FTL 620 relocates data by marking data as UECC in the metadata of the SLC cache block. At operation 668, the FTL 620 completes the SLC refresh and, thereafter, the method 600 proceeds to operation 636. As previously noted, at operation 636, the FTL 620 performs a SLC-to-QLC data migration on the SLC blockset (that includes the SLC cache block) with padding and, at operation 638, the FTL 620 retires the SLC blockset after the data migration is complete.

Figure 7:
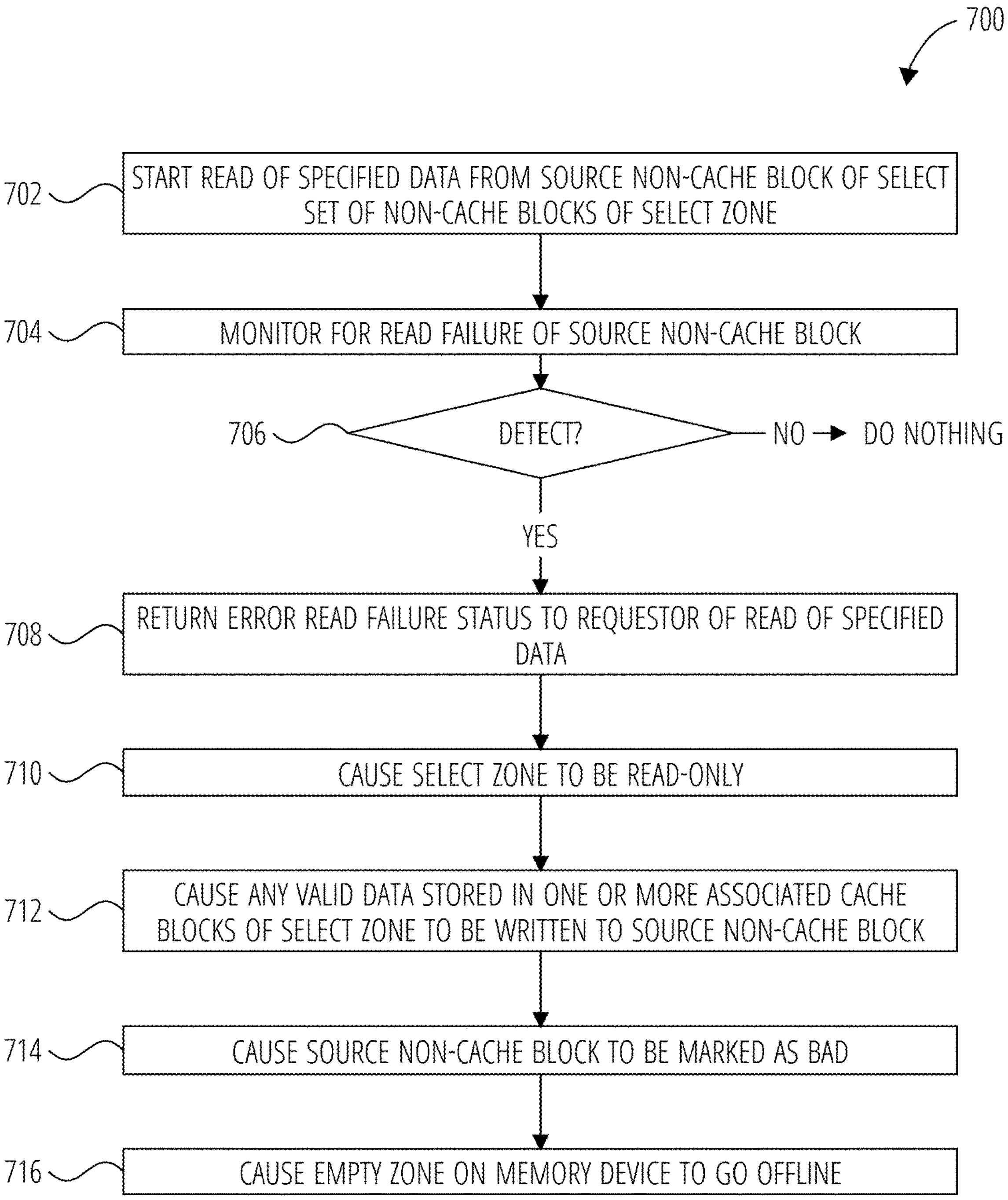

Referring now to FIG. 7, the method 700 illustrates an example method for handling block read failure during a data read (e.g., host data read or internal scan read) of a non-cache block (e.g., QLC non-cache block) of a zone on a memory sub-system that supports zones. At operation 702, a processing device (e.g., the processor 117 of the memory sub-system controller 115) starts read of specified data from a source non-cache block of a select set of non-cache blocks of a select zone of a memory device (e.g., memory device 130). For various embodiments, the memory device comprises a set of zones for storing data, and the select zone (of the set of zones) comprises a select set of cache blocks and a select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification.

While the specified data is being read from the source non-cache block, at operation 704, the processing device (e.g., the processor 117 of the memory sub-system controller 115) monitors (e.g., detects) for a read failure of the source non-cache block. At decision block 706, in response to the read failure being detected by operation 704, the method 700 proceeds to operation 708. Alternatively, at decision block 706, in response to the read failure not being detected by operation 704, the method 700 does nothing and the reading of the specified data from the source non-cache block is assumed to have been completed without read failure.

At operation 708, the processing device (e.g., the processor 117 of the memory sub-system controller 115) returns an error read failure status (e.g., "Unrecoverable Read Error" status) to a requestor (e.g., host system 120) of the read of the specified data. For various embodiments, the read failure is an uncorrectable read failure, such as a UECC error (e.g., QLC UECC error). During operation 710, the processing device causes the select zone to be read-only. During operation 710, the processing device can also suggest to a requestor (e.g., the host system) to take the select zone offline. After operation 710, the method 700 proceeds to operation 712.

During operation 712, the processing device (e.g., the processor 117 of the memory sub-system controller 115) causes any valid data (e.g., readable data) stored in one or more associated cache blocks of the select zone to be written to the source non-cache block. Thereafter, at operation 714, the processing device causes the source non-cache block to be marked as bad (e.g., GBB). After the causing of the source non-cache block to be marked as bad, at operation 716, the processing device causes an empty zone on the memory device to go offline.

Figure 8:
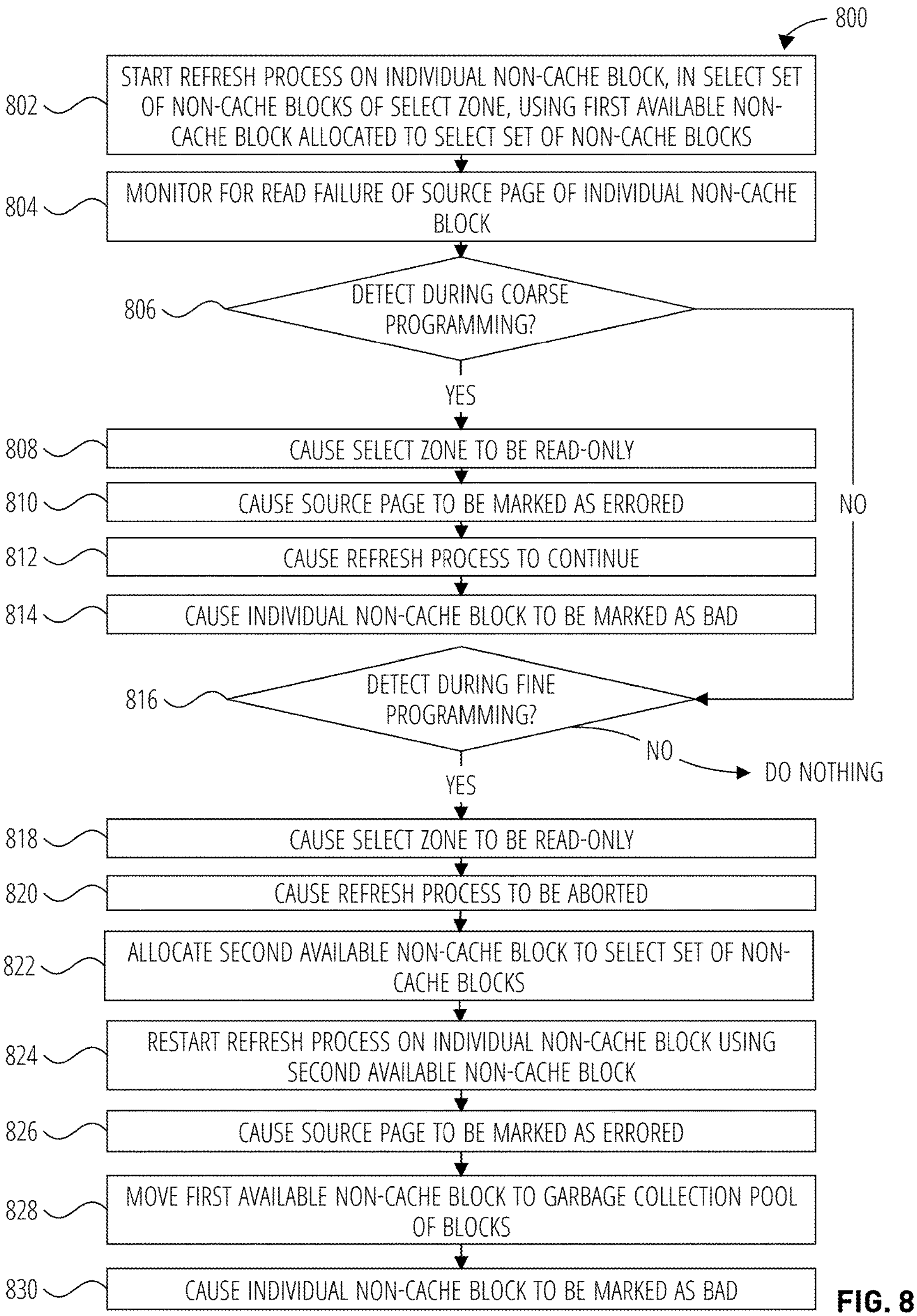

Referring now to FIG. 8, the method 800 illustrates an example method for handling block read failure of a non-cache block during refresh of the non-cache block (e.g., QLC non-cache block) of a zone on a memory sub-system that supports zones. At operation 802, a processing device (e.g., the processor 117 of the memory sub-system controller 115) starts a refresh process on an individual non-cache block, in a select set of non-cache blocks of a select zone on a memory device (e.g., memory device 130), using a first available non-cache block allocated to the select set of non-cache blocks, where the memory device comprises a set of zones for storing data that includes the select zone. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification. Depending on the embodiment, the refresh process can be started (e.g., triggered) on the select non-cache block as part of a wear leveling process, a garbage collection process, a media scan process, a read disturb process, or another background process being performed on the select non-cache block.

While the refresh process is being performed, at operation 804, the processing device (e.g., the processor 117 of the memory sub-system controller 115) monitors (e.g., detects) for a read failure of a source page of the individual non-cache block. At decision block 806, in response to detecting the read failure of the source page during coarse programming of the first available non-cache block, the method 800 proceeds to operation 808. Alternatively, at decision block 806, in response to not detecting the read failure of the source page during coarse programming of the first available non-cache block, the method 800 proceeds to decision block 816.

At operation 808, the processing device (e.g., the processor 117 of the memory sub-system controller 115) causes the select zone to be read-only. At operation 810, the processing device causes the source page to be marked as errored (e.g., mark UECC in the metadata of the source page, which represents a failed page or a read failure (RF) page). During operation 812, the processing device causes the refresh process to continue and, at operation 814, the processing device causes the individual non-cache block to be marked as bad (e.g., GBB). Thereafter, the individual non-cache block can be removed from the select set of non-cache blocks of the select zone (e.g., the individual cache block is released from the select zone).

At decision block 816, in response to detecting the read failure of the source page during fine programming of the first available non-cache block, the method 800 proceeds to operation 818. Alternatively, at decision block 816, in response to not detecting the read failure of the source page during fine programming of the first available non-cache block, the method 800 does nothing and the refresh process is assumed to have been completed without read failure.

At operation 818, the processing device (e.g., the processor 117 of the memory sub-system controller 115) causes the select zone to be read-only. At operation 820, the processing device causes the refresh process to be aborted. Thereafter, at operation 822, the processing device allocates a second available non-cache block to the select set of non-cache blocks and, at operation 824, the processing device restarts the refresh process on the individual non-cache block using the second available non-cache block. Thereafter, at operation 826, the processing device causes the source page to be marked as errored (e.g., mark UECC in the metadata of the source page, which represents a failed page or a read failure (RF) page). During operation 828, the processing device moves (e.g., adds) the first non-cache block to a garbage collection pool of blocks. By moving (e.g., adding) the first non-cache block to the garbage collection pool, the first non-cache block can be processed by a garbage collection process (e.g., of the memory sub-system) and reused (e.g., for another purpose). Eventually, at operation 830, the processing device causes the individual non-cache block to be marked as bad (e.g., GBB). Thereafter, the individual non-cache block can be removed from the select set of non-cache blocks of the select zone (e.g., the individual cache block is released from the select zone).

Figure 9A:
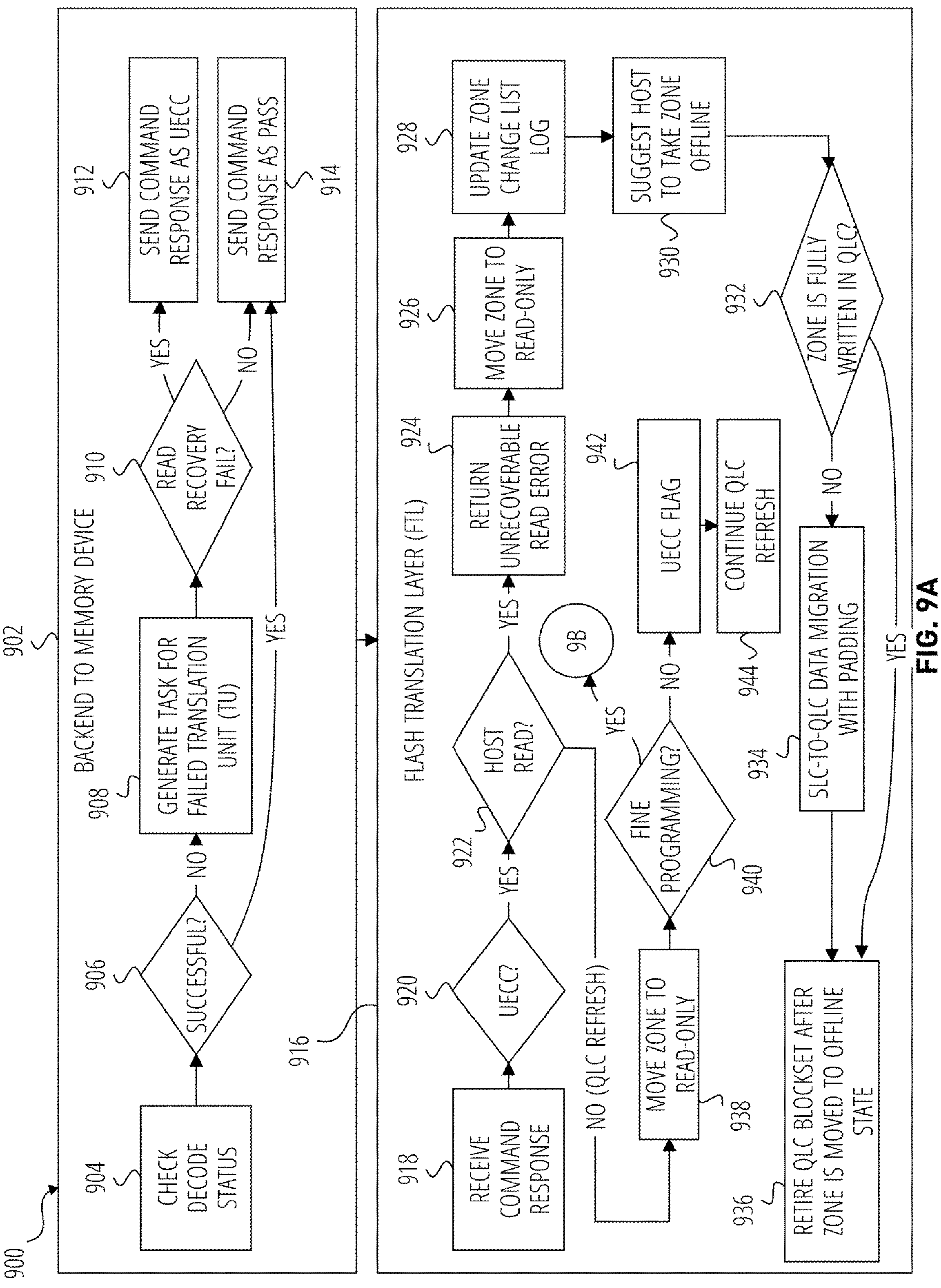

Referring now to FIG. 9A, the method 900 illustrates an example implementation of methods 700, 800 with respect to SLC cache blocks and QLC non-cache blocks of a memory sub-system that supports zones. As shown, the method 900 is implemented with respect to a backend to memory device 902 of a memory sub-system (e.g., 110) and a flash translation layer (FTL) 916 of the memory sub-system. At operation 904, the backend to memory device 902 checks a decode status of a page (e.g., a translation unit of the page) of a QLC non-cache block to determine whether decoding of the page was successful or failed, where a decode failure can represent a read error. At decision block 906, in response to the decode being successful, the method 900 proceeds to operation 914, where the backend to memory device 902 sends a pass command response to the FTL 916. Alternatively, at decision block 906, in response to the decode not being successful, the method 900 proceeds to operation 908, where the backend to memory device 902 generates a task to perform a read recovery process for a failed translation unit of the page that caused the decode failure. After operation 908, at decision block 910, in response to the read recovery process failing, the method 900 proceeds to operation 912, where the backend to memory device 902 sends a UECC command response to the FTL 916. Alternatively, at decision block 910, in response to the read recovery process being successful, the method 900 proceeds to operation 914, where the backend to memory device 902 sends a pass command response to the FTL 916.

The FTL 916 receives the command response for QLC non-cache block from the backend to memory device 902 (at operation 918). At decision block 920, in response to the command response being a UECC command response, the method 900 proceeds to decision block 922. Alternatively, at decision block 920, in response to the command response being a pass command response, a normal path of read command flow is followed (not shown).

At decision block 922, in response to the UECC command response being associated with a host read, the method 900 proceeds to operation 924, otherwise the method 900 proceeds to operation 938, where the UECC command response is assumed to be associated with a QLC refresh operation.

At operation 924, the FTL 916 returns an unrecoverable read error to the host (e.g., to a host system 120) and, at operation 926, the FTL 916 moves the zone to a read-only state. Thereafter, at operation 928, the FTL 916 updates the zone change list log and, at operation 930, the FTL 916 suggests to the host to take the zone offline. During decision blockset 932, in response to the zone being fully written in a target QLC blockset, the method 900 proceeds to operation 936, where the FTL 916 retires the source QLC blockset (that includes the QLC non-cache block with the failed page) after the zone is moved to an offline state. Alternatively, at decision blockset 932, in response to the zone not being fully written in the target QLC blockset of the zone, the method 900 proceeds to operation 934, where the FTL 916 performs an SLC-to-QLC data migration with padding. After operation 934, the method 900 proceeds to operation 936.

At operation 924, the FTL 916 moves the zone to a read-only state. At decision block 940, in response to the UECC occurring during fine programming of a target QLC blockset, the method 900 proceeds to operation 946 (on FIG. 9B), otherwise the UECC has occurred during coarse programming of the target QLC blockset and the method 900 proceeds to operation 942. At operation 942, the FTL 916 applies a UECC flag to metadata of the failed page of the QLC non-cache block of the source QLC blockset. After operation 942, at operation 944, the FTL 916 continues a refresh process on the source QLC blockset (using the target QLC blockset).

Figure 9B:
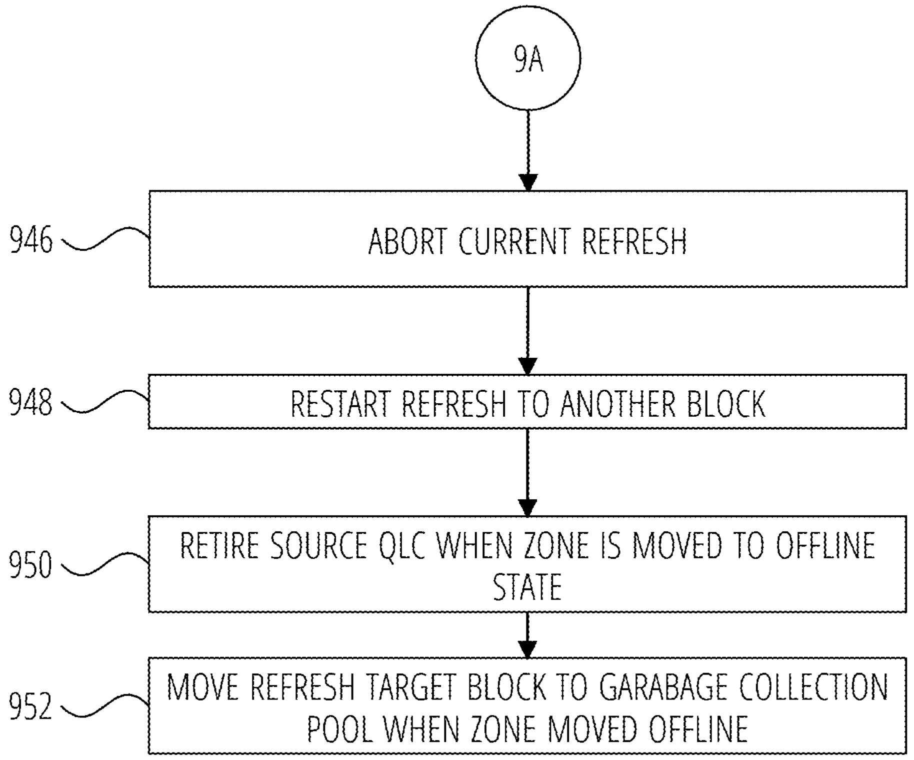

Referring now to FIG. 9B, at operation 946, the FTL 916 aborts the current refresh process. At operation 948, the FTL 916 restarts the refresh process with another target QLC non-cache block and, at operation 950, the FTL 916 retires the source QLC blockset after the zone is moved to an offline state. Eventually, at operation 952, the FTL 916 moves a current target QLC blockset of the refresh process to a garbage collection pool (to facilitate its reuse) after the zone is moved to an offline state.

Figure 10:
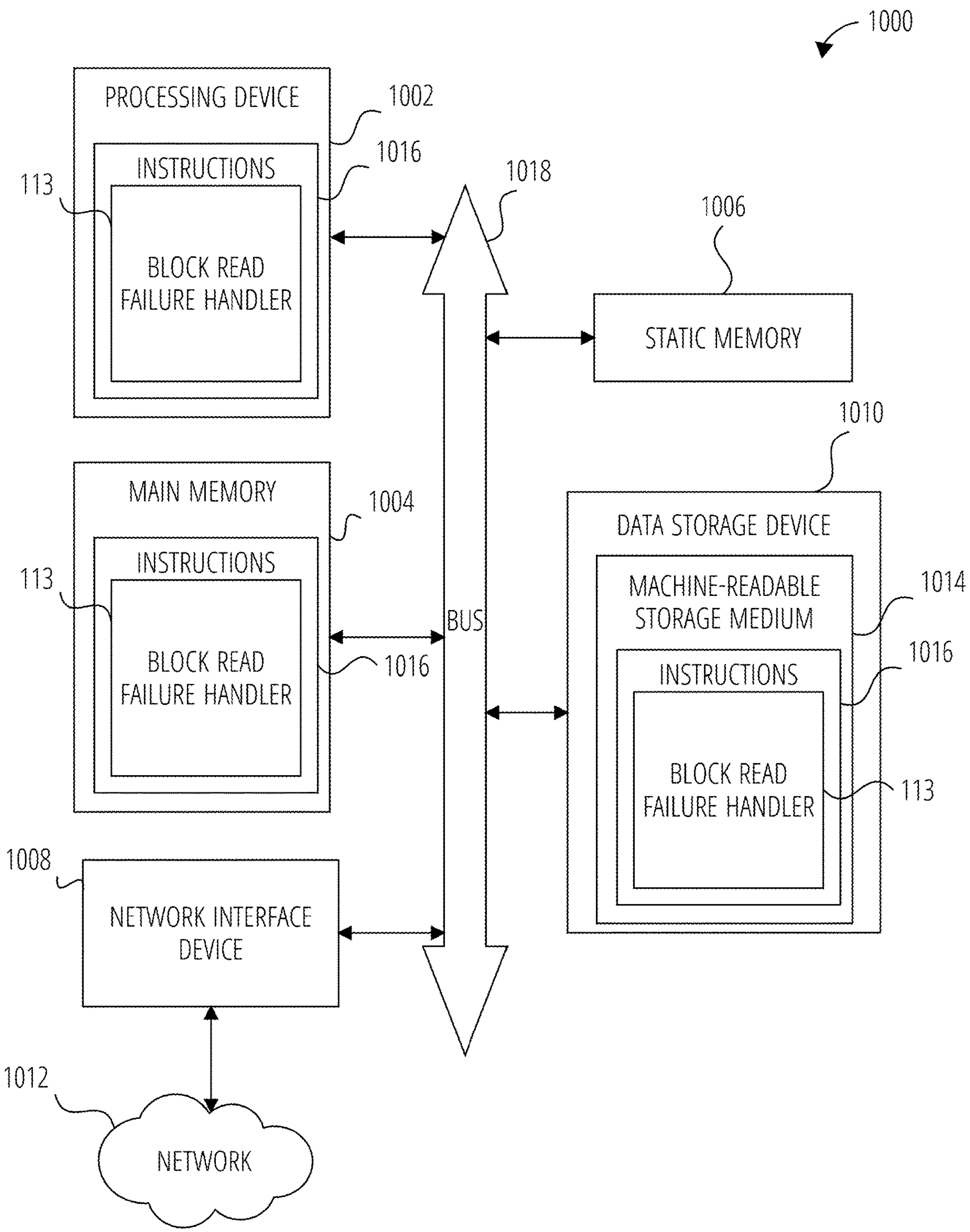
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., ROM, flash memory, DRAM such as SDRAM or Rambus DRAM (RDRAM), etc.), a static memory 1006 (e.g., flash memory, static random access memory (SRAM), etc.), and a data storage device 1010, which communicate with each other via a bus 1018.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application-specific integrated circuit (ASIC), a field programmable gate array (FPGA), a digital signal processor (DSP), a network processor, or the like. The processing device 1002 is configured to execute instructions 1016 for performing the operations and steps discussed herein. The computer system 1000 can further include a network interface device 1008 to communicate over a network 1012.

The data storage device 1010 can include a machine-readable storage medium 1014 (also known as a computer-readable medium) on which is stored one or more sets of instructions 1016 or software embodying any one or more of the methodologies or functions described herein. The instructions 1016 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1014, data storage device 1010, and/or main memory 1004 can correspond to the memory sub-system 110 of FIG. 1.

In one embodiment, the instructions 1016 include instructions to implement functionality corresponding to providing block failure protection for a zone memory sub-system as described herein (e.g., the block read failure handler 113 of FIG. 1). While the machine-readable storage medium 1014 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device comprising a set of zones for storing data, a select zone of the set of zones comprising a select set of cache blocks and a select set of non-cache blocks; and a processing device, operatively coupled to the memory device, configured to perform operations comprising: starting read of specified data from a source cache block of the select set of cache blocks of the select zone; and while the specified data is being read from the source cache block: monitoring for a read failure of the source cache block; and in response to detecting the read failure of the source cache block: determining whether the specified data is stored on an individual non-cache block of the select set of non-cache blocks; starting read of the specified data from the individual non-cache block in response to determining that the specified data is stored on the individual non-cache block; causing the select zone to be marked as finished; causing remaining valid data stored in the source cache block to be written to one or more non-cache blocks of the select set of non-cache blocks; and causing the source cache block to be marked as bad.

In Example 2, the subject matter of Example 1 includes, wherein the read failure is an uncorrectable read failure.

In Example 3, the subject matter of Examples 1-2 includes, wherein the operations comprise: in response to detecting the read failure of the source cache block, after the causing of the source cache block to be marked as bad: causing the source cache block to be removed from the select set of cache blocks.

In Example 4, the subject matter of Examples 1-3 includes, wherein the source cache block is from a select set of memory die planes of the memory device, and wherein the operations comprise: in response to detecting the read failure of the source cache block, after the causing of the source cache block to be marked as bad: determining whether the select set of memory die planes satisfies a condition that indicates a shortage of cache block capacity of the memory device; and in response to determining that the memory device does satisfy a condition that indicates the shortage of cache block capacity of the memory device, retiring the select set of memory die planes.

In Example 5, the subject matter of Examples 1-4 includes, wherein the operations comprise: prior to the causing of the select zone to be marked as finished, permitting an ongoing cache block programming operation being performed on the select zone to finish.

In Example 6, the subject matter of Examples 1-5 includes, wherein the operations comprise: prior to the causing of the select zone to be marked as finished, permitting a program queued for the source cache block to be performed.

In Example 7, the subject matter of Examples 1-6 includes, wherein the operations comprise: while the specified data is being read from the individual non-cache block: monitoring for a read failure of the individual non-cache block; and in response to detecting the read failure of the individual non-cache block, returning an error read failure status to a requestor of the read of the specified data.

In Example 8, the subject matter of Examples 1-7 includes, wherein the operations comprise: while the specified data is being read from the individual non-cache block: monitoring for a read failure of the individual non-cache block; and in response to not detecting the read failure of the individual non-cache block, returning the specified data, read from the individual non-cache block, to a requestor of the read of the specified data.

In Example 9, the subject matter of Examples 1-8 includes, wherein the operations comprise: starting a refresh process on another cache block in the select set of cache blocks using an available cache block allocated to the select set of cache blocks; and while the refresh process is being performed: monitoring for a read failure of a source page of the other cache block; and in response to detecting the read failure of the source page of the other cache block: causing the source page to be marked as errored; continuing performance of the refresh process; causing the select zone to be marked as finished; causing stored data from one or more non-errored pages of the other cache block to be written to one or more non-cache blocks of the select set of non-cache blocks; and causing the other cache block to be marked as bad.

In Example 10, the subject matter of Example 9 includes, wherein the other cache block is from a select set of memory die planes of the memory device, and wherein the operations comprise: in response to detecting the read failure of the other cache block, after the causing of the other cache block in the select set of cache blocks to be marked as bad: determining whether the select set of memory die planes satisfies a condition that indicates a shortage of cache block capacity of the memory device; and in response to determining that the memory device does satisfy a condition that indicates the shortage of cache block capacity of the memory device, retiring the select set of memory die planes.

In Example 11, the subject matter of Examples 1-10 includes, wherein the select set of cache blocks comprises one or more single-level cell (SLC) blocks.

In Example 12, the subject matter of Examples 1-11 includes, wherein the select set of non-cache blocks comprises one or more quad-level cell (QLC) blocks.

In Example 13, the subject matter of Examples 1-12 includes, wherein the source cache block is a first source cache block, and wherein operations comprising: starting migration of stored data, from a second source cache block of the select set of cache blocks, to an individual non-cache block of the select set of non-cache blocks; and while the migration is being performed: monitoring for a read failure of the second source cache block; and in response to detecting the read failure of the second source cache block: causing the select zone to be marked as finished; causing remaining valid data stored in the second source cache block to be written to the individual non-cache block; and causing the second source cache block to be marked as bad.

Example 14 is at least one non-transitory machine-readable storage medium comprising instructions that, when executed by a processing device, cause the processing device to perform operations comprising: starting read of specified data from a source non-cache block of a select set of non-cache blocks of a select zone of a memory device; and while the specified data is being read from the source non-cache block: monitoring for a read failure of the source non-cache block; and in response to detecting the read failure of the source non-cache block: causing the select zone to be read-only; and causing the source non-cache block to be marked as bad.

In Example 15, the subject matter of Example 14 includes, wherein the read failure is an uncorrectable read failure.

In Example 16, the subject matter of Examples 14-15 includes, wherein the operations comprise: returning an error read failure status to a requestor of the read of the specified data.

In Example 17, the subject matter of Examples 14-16 includes, wherein the operations comprise: causing any valid data stored in one or more associated cache blocks of the select zone to be written to the source non-cache block.

In Example 18, the subject matter of Examples 14-17 includes, wherein the operations comprise: in response to detecting the read failure of the source non-cache block, after the causing of the source non-cache block to be marked as bad: causing an empty zone on the memory device to go offline.

Example 19 is a method comprising: starting a refresh process on an individual non-cache block, in a select set of non-cache blocks of a select zone on a memory device, using an available non-cache block allocated to the select set of non-cache blocks; and while the refresh process is being performed: monitoring for a read failure of a source page of the individual non-cache block; in response to detecting the read failure of the source page during coarse programming of the available non-cache block: causing the select zone to be read-only; causing the source page to be marked as errored; causing the refresh process to continue; and causing the individual non-cache block to be marked as bad.

In Example 20, the subject matter of Example 19 includes, wherein the available non-cache block is a first available non-cache block, and wherein the method comprises: in response to detecting the read failure of the source page during fine programming of the available non-cache block: causing the select zone to be read-only; causing the refresh process to be aborted; allocating a second available non-cache block to the select set of non-cache blocks; restarting the refresh process on the individual non-cache block using the second available non-cache block; causing the source page to be marked as errored; moving the first available non-cache block to a garbage collection pool of blocks; and causing the individual non-cache block to be marked as bad.

Example 21 is a method to implement any of Examples 1-13.

Example 22 is at least one machine-readable medium comprising instructions that, when executed by a processing device, cause the processing device to perform operations to implement any of Examples 1-13.

Example 23 is a system to implement any of Examples 14-18.

Example 24 is at least one machine-readable medium comprising instructions that, when executed by a processing device, cause the processing device to perform operations to implement any of Examples 14-18.

Example 25 is a system to implement any of Examples 19-20.

Example 26 is a method to implement any of Examples 19-20.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:
   a memory device comprising a set of zones for storing data, a select zone of the set of zones comprising a select set of single-level cell (SLC) cache blocks and a select set of non-cache blocks; and
   a processing device, operatively coupled to the memory device, configured to perform operations comprising:
      causing select data being written to the select zone to be written first to the select set of SLC cache blocks;
      causing the select data stored on the select set of SLC cache blocks to be subsequently moved to the select set of non-cache blocks;
      starting read of specified data from a source SLC cache block of the select set of SLC cache blocks of the select zone; and
      while the specified data is being read from the source SLC cache block:
         monitoring for a read failure of the source SLC cache block; and
         in response to detecting the read failure of the source SLC cache block:
            determining whether the specified data is stored on an individual non-cache block of the select set of non-cache blocks;
            starting read of the specified data from the individual non-cache block in response to determining that the specified data is stored on the individual non-cache block;
            causing the select zone to be marked as finished;
            causing remaining valid data stored in the source SLC cache block to be written to one or more non-cache blocks of the select set of non-cache blocks; and
            causing the source SLC cache block to be marked as bad.

2. The system of claim 1, wherein the read failure is an uncorrectable read failure.

3. The system of claim 1, wherein the operations comprise:
   in response to detecting the read failure of the source SLC cache block, after the causing of the source SLC cache block to be marked as bad:
      causing the source SLC cache block to be removed from the select set of SLC cache blocks.

4. The system of claim 1, wherein the source SLC cache block is from a select set of memory die planes of the memory device, and wherein the operations comprise:
   in response to detecting the read failure of the source SLC cache block, after the causing of the source SLC cache block to be marked as bad:
      determining whether the select set of memory die planes satisfies a condition that indicates a shortage of SLC cache block capacity of the memory device; and
      in response to determining that the memory device does satisfy a condition that indicates the shortage of SLC cache block capacity of the memory device, retiring the select set of memory die planes.

5. The system of claim 1, wherein the operations comprise:
   prior to the causing of the select zone to be marked as finished, permitting an ongoing SLC cache block programming operation being performed on the select zone to finish.

6. The system of claim 1, wherein the operations comprise:
   prior to the causing of the select zone to be marked as finished, permitting a program queued for the source SLC cache block to be performed.

7. The system of claim 1, wherein the operations comprise:
   while the specified data is being read from the individual non-cache block:
   monitoring for a read failure of the individual non-cache block; and
   in response to detecting the read failure of the individual non-cache block, returning an error read failure status to a requestor of the read of the specified data.

8. The system of claim 1, wherein the operations comprise:
   while the specified data is being read from the individual non-cache block:
   monitoring for a read failure of the individual non-cache block; and
   in response to not detecting the read failure of the individual non-cache block, returning the specified data, read from the individual non-cache block, to a requestor of the read of the specified data.

9. The system of claim 1, wherein the operations comprise:
   starting a refresh process on another SLC cache block in the select set of SLC cache blocks using an available SLC cache block allocated to the select set of SLC cache blocks; and
   while the refresh process is being performed:
      monitoring for a read failure of a source page of the other SLC cache block; and
      in response to detecting the read failure of the source page of the other SLC cache block:
         causing the source page to be marked as errored;
         continuing performance of the refresh process;
         causing the select zone to be marked as finished;
         causing stored data from one or more non-errored pages of the other SLC cache block to be written to one or more non-cache blocks of the select set of non-cache blocks; and
         causing the other SLC cache block to be marked as bad.

10. The system of claim 9, wherein the other SLC cache block is from a select set of memory die planes of the memory device, and wherein the operations comprise:

in response to detecting the read failure of the other SLC cache block, after the causing of the other SLC cache block in the select set of SLC cache blocks to be marked as bad:

determining whether the select set of memory die planes satisfies a condition that indicates a shortage of SLC cache block capacity of the memory device; and in response to determining that the memory device does satisfy a condition that indicates the shortage of SLC cache block capacity of the memory device, retiring the select set of memory die planes.

11. The system of claim 1, wherein the select set of non-cache blocks comprises one or more quad-level cell (QLC) blocks.

12. The system of claim 1, wherein the source SLC cache block is a first source SLC cache block, and wherein operations comprising:

starting migration of stored data, from a second source SLC cache block of the select set of SLC cache blocks, to an individual non-cache block of the select set of non-cache blocks; and while the migration is being performed:

monitoring for a read failure of the second source SLC cache block; and in response to detecting the read failure of the second source SLC cache block:

causing the select zone to be marked as finished;

causing remaining valid data stored in the second source SLC cache block to be written to the individual non-cache block; and causing the second source SLC cache block to be marked as bad.

13. At least one non-transitory machine-readable storage medium comprising instructions that, when executed by a processing device, cause the processing device to perform operations comprising:

causing select data being written to a select zone on a memory device to be written first to a set of single-level cell (SLC) cache blocks of the select zone;

causing the select data stored on the set of SLC cache blocks to be subsequently moved to a select set of non-cache blocks of the select zone;

starting read of specified data from a source non-cache block of the select set of non-cache blocks; and while the specified data is being read from the source non-cache block:

monitoring for a read failure of the source non-cache block; and in response to detecting the read failure of the source non-cache block:

causing the select zone to be read-only; and causing the source non-cache block to be marked as bad.

14. The non-transitory machine-readable storage medium of claim 13, wherein the read failure is an uncorrectable read failure.

15. The non-transitory machine-readable storage medium of claim 13, wherein the operations comprise:

returning an error read failure status to a requestor of the read of the specified data.

16. The non-transitory machine-readable storage medium of claim 13, wherein the operations comprise:

causing any valid data stored in one or more associated SLC cache blocks of the select zone to be written to the source non-cache block.

17. The non-transitory machine-readable storage medium of claim 13, wherein the operations comprise:

in response to detecting the read failure of the source non-cache block, after the causing of the source non-cache block to be marked as bad:

causing an empty zone on the memory device to go offline.

18. A method comprising:

causing select data being written to a select zone on a memory device to be written first to a set of single-level cell (SLC) cache blocks of the select zone;

causing the select data stored on the set of SLC cache blocks to be subsequently moved to a select set of non-cache blocks of the select zone;

starting a refresh process on an individual non-cache block, in the select set of non-cache blocks, using an available non-cache block allocated to the select set of non-cache blocks; and while the refresh process is being performed:

monitoring for a read failure of a source page of the individual non-cache block; and in response to detecting the read failure of the source page during coarse programming of the available non-cache block:

causing the select zone to be read-only;

causing the source page to be marked as errored;

causing the refresh process to continue; and causing the individual non-cache block to be marked as bad.

19. The method of claim 18, wherein the available non-cache block is a first available non-cache block, and wherein the method comprises:

in response to detecting the read failure of the source page during fine programming of the available non-cache block:

causing the select zone to be read-only;

causing the refresh process to be aborted;

allocating a second available non-cache block to the select set of non-cache blocks;

restarting the refresh process on the individual non-cache block using the second available non-cache block;

causing the source page to be marked as errored;

moving the first available non-cache block to a garbage collection pool of blocks; and causing the individual non-cache block to be marked as bad.

20. The method claim of 18, wherein the select set of non-cache blocks comprises one or more quad-level cell (QLC) blocks.

* * * * *